United States Patent
Li et al.

(10) Patent No.: US 10,778,606 B2
(45) Date of Patent: Sep. 15, 2020

(54) RESOURCE ALLOCATION METHOD AND SYSTEM ON SOFTWARE DEFINED PROTOCOL NETWORK

(71) Applicant: HUAWEI TECHNOLOGIES CO., LTD., Shenzhen, Guangdong (CN)

(72) Inventors: Hong Li, Shanghai (CN); Chenghui Peng, Munich (DE)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 239 days.

(21) Appl. No.: 15/942,114

(22) Filed: Mar. 30, 2018

(65) Prior Publication Data

US 2018/0227246 A1    Aug. 9, 2018

Related U.S. Application Data

(63) Continuation of application No. PCT/CN2016/097149, filed on Aug. 29, 2016.

(30) Foreign Application Priority Data

Sep. 30, 2015  (CN) .......................... 2015 1 0640906

(51) Int. Cl.
  *H04L 12/911*    (2013.01)
  *H04L 29/06*    (2006.01)
(52) U.S. Cl.
  CPC ............. *H04L 47/82* (2013.01); *H04L 29/06* (2013.01)
(58) Field of Classification Search
  CPC ................................ H04L 29/06; H04L 47/82
  See application file for complete search history.

(56) References Cited

U.S. PATENT DOCUMENTS

2003/0204634 A1* 10/2003 Pinkerton ............... H04L 29/06
                                                         709/250
2007/0083662 A1    4/2007 Adams et al.
(Continued)

FOREIGN PATENT DOCUMENTS

CN    101030961 A    9/2007
CN    101149692 A    3/2008
(Continued)

OTHER PUBLICATIONS

Wen et al. (Protocol Stack Mapping of Software Defined Protocol for Next Generation Mobile Networks, 2016) (Year: 2016).*

*Primary Examiner* — Abdulkader M Alriyashi
(74) *Attorney, Agent, or Firm* — Womble Bond Dickinson (US) LLP

(57) ABSTRACT

The present disclosure provides a resource allocation method and system on a Software Defined Protocol (SDP) network. The method includes: receiving, by a resource allocator, a resource request message sent by a protocol stack deployment node, where the resource request message carries information about a protocol stack deployed on the protocol stack deployment node; determining, by the resource allocator, information about an available resource on an SDP network, where the available resource is used for resource allocation of the protocol stack; determining, by the resource allocator according to the information about the protocol stack and the information about the available resource, a resource allocated to each protocol layer in the protocol stack; and sending, by the resource allocator, a resource feedback message to the protocol stack deployment node, where the resource feedback message carries the information about the resource allocated to each protocol layer.

16 Claims, 9 Drawing Sheets

(56) References Cited

U.S. PATENT DOCUMENTS

| | | |
|---|---|---|
| 2007/0169127 A1 | 7/2007 | Kashyap |
| 2008/0215846 A1 | 9/2008 | Aman et al. |
| 2014/0310388 A1 | 10/2014 | Djukic et al. |
| 2015/0071170 A1 | 3/2015 | Zhang |
| 2015/0207717 A1 | 7/2015 | Djukic et al. |

FOREIGN PATENT DOCUMENTS

| | | |
|---|---|---|
| CN | 101707687 A | 5/2010 |
| CN | 102131296 A | 7/2011 |
| WO | 2014/197778 A1 | 12/2014 |

* cited by examiner

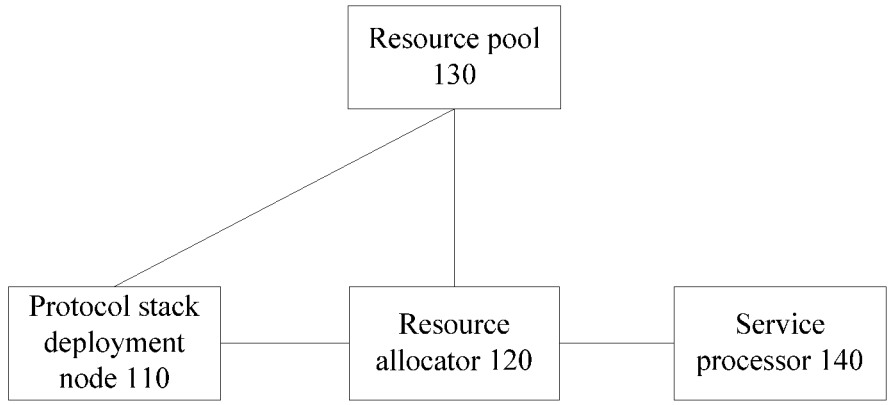

| A resource allocator receives a resource request message sent by a protocol stack deployment node, where the resource request message carries information about a protocol stack deployed on the protocol stack deployment node | ~ S210 |

| The resource allocator determines information about an available resource on an SDP network, where the available resource is used for resource allocation of the protocol stack | ~ S220 |

| The resource allocator determines, according to the information about the protocol stack and the information about the available resource, information about a resource allocated to each protocol layer in the protocol stack | ~ S230 |

| The resource allocator sends a resource feedback message to the protocol stack deployment node, where the resource feedback message carries the information about the resource allocated to each protocol layer in the protocol stack | ~ S240 |

```
┌─────────────────────────────────────────────────────┐
│ A resource allocator receives a resource request    │
│ message sent by a protocol stack deployment node,   │
│ where the resource request message carries          │
│ information about a protocol stack deployed on the  │──~ S410
│ protocol stack deployment node and service          │
│ information of at least one to-be-processed         │
│ service, where the service information is used for  │
│ determining a service type of a to-be-processed     │
│ service                                             │
└─────────────────────────────────────────────────────┘
                          │
                          ▼
┌─────────────────────────────────────────────────────┐
│ The resource allocator determines information about │
│ an available resource on an SDP network, where the  │──~ S420
│ available resource is allocated to a protocol layer │
└─────────────────────────────────────────────────────┘
                          │
                          ▼
┌─────────────────────────────────────────────────────┐
│ The resource allocator determines information about │
│ a resource allocated to a $k^{th}$ service type     │──~ S430
│ according to the service information and the        │
│ information about the available resource            │
└─────────────────────────────────────────────────────┘
                          │
                          ▼
┌─────────────────────────────────────────────────────┐
│ The resource allocator determines, according to the │
│ information about the protocol stack and the        │
│ information about the resource allocated to the     │
│ $k^{th}$ service type, information about a resource │──~ S440
│ that is allocated to each protocol layer in the     │
│ protocol stack and that is used for processing a    │
│ to-be-processed service of the $k^{th}$ service type│
└─────────────────────────────────────────────────────┘
                          │
                          ▼
┌─────────────────────────────────────────────────────┐
│ The resource allocator sends a resource feedback    │
│ message to the protocol stack deployment node,      │
│ where the resource feedback message carries the     │
│ information about the resource that is allocated to │──~ S450
│ each protocol layer in the protocol stack and that  │
│ is used for processing the to-be-processed service  │
│ of the $k^{th}$ service type                        │
└─────────────────────────────────────────────────────┘
```

```
┌─────────────────────────────────────────────────────────────┐
│ A resource allocator receives a resource request message    │
│ sent by a protocol stack deployment node, where the         │
│ resource request message carries information about a        │
│ protocol stack on the protocol stack deployment node        │ ~ S510
│ and service information of at least one to-be-processed     │
│ service type on the protocol stack deployment node, and     │
│ the service information is used to indicate that all        │
│ to-be-processed services are of K service types             │
└─────────────────────────────────────────────────────────────┘
                              │
                              ▼
┌─────────────────────────────────────────────────────────────┐
│ The resource allocator determines a first available         │
│ resource on the SDP network, where the first available      │ ~ S520
│ resource is allocated to a protocol layer                   │
└─────────────────────────────────────────────────────────────┘
                              │
                              ▼
┌─────────────────────────────────────────────────────────────┐
│ The resource allocator sends a resource pre-request         │
│ message to a service processor, where the resource          │
│ pre-request message carries service information and         │
│ information about the first available resource, so that the │ ~ S530
│ service processor determines, according to the service      │
│ information and the information about the first available   │
│ resource, an available resource allocated to a $k^{th}$     │
│ service type of the K service types from the first          │
│ available resource                                          │
└─────────────────────────────────────────────────────────────┘
                              │
                              ▼
┌─────────────────────────────────────────────────────────────┐
│ The resource allocator receives a resource pre-request      │
│ feedback message sent by the service processor, where       │
│ the resource pre-request feedback message carries           │ ~ S540
│ information about the available resource allocated to       │
│ the $k^{th}$ service type                                   │
└─────────────────────────────────────────────────────────────┘
                              │
                              ▼
┌─────────────────────────────────────────────────────────────┐
│ The resource allocator determines, from the available       │
│ resource allocated to the $k^{th}$ service type according   │
│ to the information about the protocol stack, an available   │ ~ S550
│ resource that is allocated to each protocol layer in the    │
│ protocol stack and that is used for processing a            │
│ to-be-processed service of the $k^{th}$ service type        │
└─────────────────────────────────────────────────────────────┘
                              │
                              ▼
┌─────────────────────────────────────────────────────────────┐
│ The resource allocator sends a resource feedback message    │
│ to the protocol stack deployment node, where the resource   │
│ feedback message carries information about the available    │
│ resource allocated to each protocol layer in the protocol   │ ~ S560
│ stack, so that the protocol stack deployment node           │
│ configures an available resource for each protocol layer    │
│ from the first available resource according to the          │
│ resource feedback message                                   │
└─────────────────────────────────────────────────────────────┘
```

FIG. 5

RESOURCE ALLOCATION METHOD AND SYSTEM ON SOFTWARE DEFINED PROTOCOL NETWORK

CROSS-REFERENCE TO RELATED APPLICATIONS

This application is a continuation of International Application No. PCT/CN2016/097149, filed on Aug. 29, 2016, which claims priority to Chinese Patent Application No. 201510640906.4, filed on Sep. 30, 2015, The disclosures of the aforementioned applications are hereby incorporated by reference in their entireties.

TECHNICAL FIELD

Embodiments of the present disclosure relate to the communications field, and more specifically, to a resource allocation method and system on a Software Defined Protocol (SDP) network.

BACKGROUND

On a Software Defined Protocol network, a method for dynamically configuring a protocol stack on a function node on a wireless network is proposed. According to the method, a protocol stack configuration function is separated from a base station or a terminal, and is deployed on a protocol stack controller. The protocol stack controller may be referred to as an SDP controller. The SDP controller obtains, from a network node such as a functional unit or a base station, related parameters and related network status information of a data stream, for example, a user identity, a connection type, mobile information, channel information, a terminal capability, and user payment information; and then determines, according to these parameters or the information, a protocol stack that processes the data stream and a configuration of each protocol layer, and determines deployment of the protocol stack. The foregoing functional unit may be a packet data network gateway (e.g., a Public Data Network-GateWay, or "P-GW"), a mobility management network element (e.g., a Mobility Management Entity, or "MME"), or the like. The protocol stack may be deployed on a network element such as a base station, a core network gateway, or a router or switch on an access network. The network element on which the protocol stack is deployed may be referred to as a protocol stack deployment node. The protocol stack deployment node may be further classified into an SDP access node and an SDP forward node according to a function of the node.

In an existing SDP technical solution, only a protocol stack on a network node, a configuration of each protocol layer in the protocol stack, and deployment of the protocol stack can be determined. However, how to allocate a resource to each protocol layer in the configured protocol stack is not determined.

SUMMARY

The present disclosure provides a resource allocation system and method on a Software Defined Protocol network, to allocate, from an available resource on the network, a resource to each protocol layer deployed on a protocol stack deployment node.

According to a first aspect, a esource allocation method on a Software Defined Protocol (SDP) network is provided, including: receiving, by the resource allocator, a resource request message sent by the protocol stack deployment node, where the resource request message carries information about a protocol stack deployed on the protocol stack deployment node; determining, by the resource allocator, information about an available resource on the SDP network, where the available resource is used for resource allocation of the protocol stack; determining, by the resource allocator according to the information about the protocol stack and the information about the available resource, information about a resource allocated to each protocol layer in the protocol stack; and sending, by the resource allocator, a resource feedback message to the protocol stack deployment node, where the resource feedback message carries the information about the resource allocated to each protocol layer in the protocol stack.

With reference to the first aspect, in a first possible implementation, the information about the available resource includes a first quantity of protocol processing modules corresponding to the available resource; and the information about the resource allocated to each protocol layer in the protocol stack includes a second quantity of protocol processing modules corresponding to the allocated resource.

With reference to the first possible implementation, in a second possible implementation, the information about the protocol stack includes a processing capability of a protocol processing module at each protocol layer in the protocol stack; and the determining, by the resource allocator according to the information about the protocol stack and the information about the available resource, information about a resource allocated to each protocol layer in the protocol stack includes: determining, by the resource allocator, the second quantity according to the processing capability of the protocol processing module at each protocol layer in the protocol stack and the first quantity, so as to obtain an optimal processing capability of performing protocol processing at all the protocol layers by using allocated resources.

With reference to the second possible implementation, in a third possible implementation, the processing capability of the protocol processing module at each protocol layer in the protocol stack includes a processing delay of the protocol processing module at each protocol layer in the protocol stack, a transmission delay between protocol processing modules at two adjacent protocol layers, and a quantity of data packets of at least one to-be-processed service; and the optimal processing capability of performing protocol processing at all the protocol layers by using the allocated resources includes: a minimum sum of delays in protocol processing at all the protocol layers by using the allocated resources, or a maximum data throughput in protocol processing at all the protocol layers by using the allocated resources.

With reference to the third possible implementation, in a fourth possible implementation, the determining, by the resource allocator, the second quantity according to the processing delay, the transmission delay, the quantity of data packets of the to-be-processed service, and the first quantity, so as obtain the minimum sum of delays in protocol processing at all the protocol layers by using the allocated resources, includes: determining, by the resource allocator according to a formula $$\min F(l_1, l_2, L, l_N) = \sum_{i=1}^{N}(T_i + \Delta T_i) + \left(\frac{P}{l_{i^*}} - 1\right)(T_{i^*} + \Delta T_{i^*}),$$

a second quantity of protocol processing modules allocated to an $i^{th}$ protocol layer, where $$\sum_{i=1}^{N} l_i = M,$$

$1 \leq l_i \leq M-N+1$, $$i^* = \underset{i \in S}{\mathrm{argmax}} \frac{T_i + \Delta T_i}{l_i},$$

S={1, 2, L, N}, N is a total quantity of protocol layers in the protocol stack; i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the first quantity, and min $F(l_1, l_2, L, l_N)$ indicates the minimum sum of delays in protocol processing at all the protocol layers by using the allocated resources.

With reference to the third possible implementation, in a fifth possible implementation, the determining, by the resource allocator, the second quantity according to the processing delay, the transmission delay, the quantity of data packets of the to-be-processed service, and the first quantity, so as to obtain a maximum data throughput in protocol processing at all the protocol layers by using the allocated resources, includes:

determining, by the resource allocator according to a formula $$\mathrm{min} F(l_1, l_2, L, l_N) = \frac{P}{\sum_{i=1}^{N} (T_i + \Delta T_i) + \left(\frac{P}{l_{i^*}} - 1\right)(T_{i^*} + \Delta T_{i^*})},$$

a quantity of protocol processing modules allocated to each protocol layer, where $$\sum_{i=1}^{N} l_i = M,$$

$1 \leq l_i \leq M-N+1$, $$i^* = \underset{i \in S}{\mathrm{argmax}} \frac{T_i + \Delta T_i}{l_i},$$

S={1, 2, L, N}, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the quantity of protocol processing modules corresponding to the available resource, $l_i$ is a quantity of protocol processing modules allocated to the $i^{th}$ protocol layer, and min $F(l_1, l_2, L, l_N)$ indicates the maximum data throughput in protocol processing at all the protocol layers by using the allocated resources.

With reference to the first aspect, in a sixth possible implementation, the resource request message carries service information of at least one service type on the protocol stack deployment node and information about a protocol stack corresponding to each of the at least one service type; and the determining, by the resource allocator according to the information about the protocol stack and the information about the available resource, information about a resource allocated to each protocol layer in the protocol stack includes: determining, by the resource allocator according to the service information and the information about the available resource, information about a resource allocated to a $k^{th}$ service type of the at least one service type; and determining, by the resource allocator according to the information about the resource allocated to the $k^{th}$ service type and information about a protocol stack corresponding to the $k^{th}$ service type, information about a resource that is allocated to each protocol layer in the protocol stack and that is used for processing a to-be-processed service of the $k^{th}$ service type, where the information about the resource allocated to each protocol layer in the protocol stack includes the information about the resource that is allocated to each protocol layer in the protocol stack and that is used for processing the to-be-processed service of the $k^{th}$ service type.

With reference to the sixth possible implementation, in a seventh possible implementation, the SDP network further includes a service processor, where the determining, by the resource allocator according to the service information and the information about the available resource, information about a resource allocated to a $k^{th}$ service type includes: sending, by the resource allocator, a resource pre-request message to the service processor, where the resource pre-request message carries the service information and the information about the available resource, so that the service processor determines, according to the resource pre-request message, the information about the resource allocated to the $k^{th}$ service type; and receiving, by the resource allocator, a resource pre-request feedback message sent by the service processor, where the resource pre-request feedback message carries the information about the resource allocated to the $k^{th}$ service type.

With reference to the sixth or seventh possible implementation, in an eighth possible implementation, the information about the available resource includes a first quantity of protocol processing modules corresponding to the available resource; the information about the resource allocated to the $k^{th}$ service type includes a second quantity of protocol processing modules corresponding to the resource allocated to the $k^{th}$ service type; and the information about the resource that is allocated to each protocol layer in the protocol stack and that is used for processing the to-be-processed service of the $k^{th}$ service type includes a third quantity of protocol processing modules corresponding to the resource that is allocated to each protocol layer in the protocol stack and that is used for processing the to-be-processed service of the $k^{th}$ service type.

With reference to the eighth possible implementation, in a ninth possible implementation, the information about the protocol stack includes a processing capability of a protocol processing module at each protocol layer in the protocol stack; and determining, by the resource allocator, the third quantity according to the information about the protocol stack corresponding to the $k^{th}$ service type and the second quantity includes: determining, by the resource allocator, the third quantity according to the second quantity and a processing capability of a protocol processing module at each protocol layer in the protocol stack corresponding to the $k^{th}$ service type, so as to obtain an optimal processing capability of performing protocol processing on the to-be-processed service of the $k^{th}$ service type at all the protocol layers by using the allocated resources.

With reference to the ninth possible implementation, in a tenth possible implementation, the processing capability of the protocol processing module at each protocol layer in the protocol stack includes a processing delay of the protocol processing module at each protocol layer in the protocol stack, a transmission delay between protocol processing modules at two adjacent protocol layers, and a quantity of data packets of the to-be-processed service of the $k^{th}$ service type; and the optimal processing capability of performing protocol processing on the to-be-processed service of the $k^{th}$ service type at all the protocol layers by using the allocated resources includes a minimum sum of delays in protocol processing on the to-be-processed service of the $k^{th}$ service type at all the protocol layers by using the allocated resources, or a maximum data throughput in protocol processing on the to-be-processed service of the $k^{th}$ service type at all the protocol layers by using the allocated resources.

With reference to the tenth possible implementation, in an eleventh possible implementation, the determining, by the resource allocator, the third quantity according to the processing delay, the transmission delay, the quantity of data packets of the to-be-processed service, and the second quantity, so as to obtain the minimum sum of delays in protocol processing on the to-be-processed service of the $k^{th}$ service type at all the protocol layers by using the allocated resources, includes: determining, by the resource allocator according to a formula $$\min F(l_1^k, l_2^k, L, l_N^k) = \sum_{i=1}^{N}(T_i + \Delta T_i) + \left(\frac{P^k}{l_{i^*}^k} - 1\right)(T_{i^*} + \Delta T_{i^*}),$$

a third quantity $l_i^k$ of protocol processing modules that are allocated to an $i^{th}$ protocol layer in the protocol stack and that are corresponding to a resource used for processing the to-be-processed service of the $k^{th}$ service type, where $$\sum_{i=1}^{N} l_i^k = M_k,$$

$1 \leq l_i^k \leq M_k - N + 1,$ $$i^* = \underset{i \in S}{\operatorname{argmax}} \frac{T_i + \Delta T_i}{l_i^k},$$

$S = \{1, 2, L, N\}$, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T dN$ is zero, $P_k$ is a quantity of data packets of the to-be-processed service of the $k^{th}$ service type, $M_k$ is the second quantity, and $\min F(l_1^k, l_2^k, L, l_N^k)$ indicates the minimum sum of delays in protocol processing on the to-be-processed service of the $k^{th}$ service type at all the protocol layers by using the allocated resources.

With reference to the tenth possible implementation, in a twelfth possible implementation, the determining, by the resource allocator, the third quantity according to the processing delay, the transmission delay, the quantity of data packets of the to-be-processed service, and the second quantity, so as to obtain the maximum data throughput in protocol processing on the to-be-processed service of the $k^{th}$ service type at all the protocol layers by using the allocated resources, includes: determining, by the resource allocator according to a formula $$\min F(l_1^k, l_2^k, L, l_N^k) = \frac{P_k}{\sum_{i=1}^{N}(T_i + \Delta T_i) + \left(\frac{P_k}{l_{i^*}^k} - 1\right)(T_{i^*} + \Delta T_{i^*})},$$

a third quantity $l_i^k$ of protocol processing modules that are allocated to an $i^{th}$ protocol layer in the protocol stack and that are corresponding to a resource used for processing the to-be-processed service of the $k^{th}$ service type, where $$\sum_{i=1}^{N} l_i^k = M_k,$$

$1 \leq l_i^k \leq M_k - N + 1,$ $$i^* = \underset{i \in S}{\operatorname{argmax}} \frac{T_i + \Delta T_i}{l_i},$$

$S = \{1, 2, L, N\}$, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $^{th}$ protocol layer and a protocol processing module at an $(i+1)^{th}$ protocol layer, $\Delta T_N$ is zero, $P_k$ is a quantity of data packets of the to-be-processed service of the $k^{th}$ service type, $M_k$ is the second quantity, and min $F(l_1^k, l_2^k, L, l_N^k)$ indicates the maximum data throughput in protocol processing on the to-be-processed service of the $k^{th}$ service type at all the protocol layers by using the allocated resources.

With reference to any one of the first aspect, or the first to the twelfth possible implementations, in a thirteenth possible implementation, the SDP network further includes a resource pool, where the determining, by the resource allocator, information about an available resource on the SDP network includes: sending, by the resource allocator, an available-resource request message to the resource pool, so that the resource pool determines the information about the available resource on the SDP network, where the available resource is used for resource allocation of the protocol stack; and receiving, by the resource allocator, an available-resource feedback message sent by the resource pool, where the available-resource feedback message carries the information about the available resource.

With reference to any one of the first aspect, or the first to the thirteenth possible implementations, in a fourteenth possible implementation, when the SDP network is a distributed network, the available resource is a local available resource of the protocol stack deployment node; or when the SDP network is a centralized network, the available resource is a global available resource on the SDP network.

According to a second aspect, a resource allocation system on a Software Defined Protocol (SDP) network is provided, where the system includes a protocol stack deployment node and a resource allocator; the resource allocator includes a first receiving module, a resource determining module, a resource allocation module, and a first sending module; the protocol stack deployment node is configured to send a resource request message to the resource allocator, where the resource request message carries information about a protocol stack deployed on the protocol stack deployment node; the first receiving module is configured to receive the resource request message sent by the protocol stack deployment node; the resource determining module is configured to determine information about an available resource on the SDP network, where the available resource is used for resource allocation of the protocol stack; the resource allocation module is configured to determine, according to the information about the protocol stack and the information about the available resource, information about a resource allocated to each protocol layer in the protocol stack; the first sending module is configured to send a resource feedback message to the protocol stack deployment node, where the resource feedback message carries the information about the resource allocated to each protocol layer in the protocol stack; and the protocol stack deployment node is further configured to receive the resource feedback message sent by the resource allocator.

With reference to the second aspect, in a first possible implementation, the information about the available resource includes a first quantity of protocol processing modules corresponding to the available resource; and the information about the resource allocated to each protocol layer in the protocol stack includes a second quantity of protocol processing modules corresponding to the allocated resource.

With reference to the first possible implementation, in a second possible implementation, the information about the protocol stack includes a processing capability of a protocol processing module at each protocol layer in the protocol stack; and the first processor is specifically configured to determine the second quantity according to the processing capability of the protocol processing module at each protocol layer in the protocol stack and the first quantity, so as to obtain an optimal processing capability of performing protocol processing at all the protocol layers by using allocated resources.

With reference to the second possible implementation, in a third possible implementation, the processing capability of the protocol processing module at each protocol layer includes a processing delay of the protocol processing module at each protocol layer in the protocol stack, a transmission delay between protocol processing modules at two adjacent protocol layers, and a quantity of data packets of at least one to-be-processed service; and the resource allocator is specifically configured to determine the second quantity according to the processing delay, the transmission delay, the quantity of data packets of the to-be-processed service, and the first quantity, so as to obtain a minimum sum of delays in protocol processing at all the protocol layers by using the allocated resources, or a maximum data throughput in protocol processing at all the protocol layers by using the allocated resources.

With reference to the third possible implementation, in a fourth possible implementation, the resource allocation module is specifically configured to determine, according to a formula $$\min F(l_1, l_2, L, l_N) = \sum_{i=1}^{N}(T_i + \Delta T_i) + \left(\frac{P}{l_{i^*}} - 1\right)(T_{i^*} + \Delta T_{i^*}),$$

a second quantity $l_i$ of protocol processing modules corresponding to a resource allocated to an $i^{th}$ protocol layer, where $$\sum_{i=1}^{N} l_i = M,$$

$1 \le l_i \le M-N+1$, $$i^* = \underset{i \in S}{\arg\max} \frac{T_i + \Delta T_i}{l_i},$$

$S=\{1, 2, L, N\}$, N is a total quantity of protocol layers in the protocol stack; i is any value ranging from 1 to N, S is a set including positive integers 1 to N, $i^*$ is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the first quantity, and min $F(l_1, l_2, L, l_N)$ indicates the minimum sum of delays in protocol processing at all the protocol layers by using the allocated resources.

With reference to the third possible implementation, in a fifth possible implementation, the resource allocation module is specifically configured to determine, according to a formula $$\min F(l_1, l_2, L, l_N) = \frac{P}{\sum_{i=1}^{N}(T_i + \Delta T_i) + \left(\frac{P}{l_{i^*}} - 1\right)(T_{i^*} + \Delta T_{i^*})},$$

a quantity of protocol processing modules allocated to each protocol layer, where $$\sum_{i=1}^{N} l_i = M,$$

$1 \leq l_i \leq M-N+1$, $$i^* = \underset{i \in S}{\arg\max}\, \frac{T_i + \Delta T_i}{l_i},$$

$S=\{1, 2, L, N\}$, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the quantity of protocol processing modules corresponding to the available resource, $l_i$ is a quantity of protocol processing modules allocated to the $i^{th}$ protocol layer, and min $F(l_1, l_2, L, l_N)$ indicates the maximum data throughput in protocol processing at all the protocol layers by using the allocated resources.

With reference to the second aspect, in a sixth possible implementation, the resource request message carries service information of at least one service type on the protocol stack deployment node and information about a protocol stack corresponding to each service type; and the resource allocation module is configured to determine, according to the service information and the information about the available resource, information about a resource allocated to a $k^{th}$ service type of the at least one service type; the resource allocation module is specifically configured to determine, according to the information about the resource allocated to the $k^{th}$ service type and information about a protocol stack corresponding to the $k^{th}$ service type, information about a resource that is allocated to each protocol layer in the protocol stack and that is used for processing a to-be-processed service of the $k^{th}$ service type, where the information about the resource allocated to each protocol layer in the protocol stack includes the information about the resource that is allocated to each protocol layer in the protocol stack and that is used for processing the to-be-processed service of the $ke^{th}$ service type.

With reference to the sixth possible implementation, in a seventh possible implementation, the system further includes a service processor, where the service processor includes a second receiving module, a service processing module, and a second sending module; the first sending module is further configured to send a resource pre-request message to the service processor, where the resource pre-request message carries the service information and the information about the available resource; the second receiving module is configured to receive the resource pre-request message sent by the resource allocator; the service processing module is configured to determine, according to the service information and the information about the available resource, the information about the resource allocated to the $k^{th}$ service type; the second sending module is configured to send a resource pre-request feedback message to the resource allocator, where the resource pre-request feedback message carries the information about the resource allocated to the $k^{th}$ service type; the first receiving module is further configured to receive the resource pre-request feedback message sent by the second sending module; and the resource allocation module is specifically configured to determine, according to the information about the protocol stack and the information about the resource allocated to the $k^{th}$ service type, the information about the resource that is allocated to each protocol layer in the protocol stack and that is used for processing the to-be-processed service of the k service type.

With reference to the seventh possible implementation, in an eighth possible implementation, the information about the available resource includes a first quantity of protocol processing modules corresponding to the available resource; the information about the resource allocated to the $k^{th}$ service type includes a second quantity of protocol processing modules corresponding to the resource allocated to the $k^{th}$ service type; and the information about the resource that is allocated to each protocol layer in the protocol stack and that is used for processing the to-be-processed service of the $k^{th}$ service type includes a third quantity of protocol processing modules corresponding to the resource that is allocated to each protocol layer in the protocol stack and that is used for processing the to-be-processed service of the $k^{th}$ service type.

With reference to the eighth possible implementation, in a ninth possible implementation, the information about the protocol stack includes a processing capability of a protocol processing module at each protocol layer in the protocol stack; and the resource allocator is specifically configured to determine the third quantity according to a processing capability of a protocol processing module at each protocol layer in the protocol stack and the second quantity, so as to obtain an optimal processing capability of performing protocol processing on the to-be-processed service of the $k^{th}$ service type at all the protocol layers by using the allocated resources.

With reference to the ninth possible implementation, in a tenth possible implementation, the processing capability of the protocol processing module at each protocol layer in the protocol stack includes a processing delay of the protocol processing module at each protocol layer in the protocol stack, a transmission delay between protocol processing modules at two adjacent protocol layers, and a quantity of data packets of the to-be-processed service of the $k^{th}$ service type; and the resource allocation module is specifically configured to determine the third quantity according to the processing delay, the transmission delay, the quantity of data packets of the to-be-processed service, and the second quantity, so as to obtain a minimum sum of delays in protocol processing on the to-be-processed service of the $k^{th}$ service type at all the protocol layers by using the allocated resources, or a maximum data throughput in protocol processing on the to-be-processed service of the $k^{th}$ service type at all the protocol layers by using the allocated resources.

With reference to the tenth possible implementation, in an eleventh possible implementation, the resource allocation module is specifically configured to determine, according to a formula $$\min F(l_1^k, l_2^k, L, l_N^k) = \sum_{i=1}^{N}(T_i + \Delta T_i) + \left(\frac{P^k}{l_{i^*}^k} - 1\right)(T_{i^*} + \Delta T_{i^*}),$$

a third quantity $l_i^k$ of protocol processing modules that are allocated to an $i^{th}$ protocol layer in the protocol stack and that are corresponding to a resource used for processing the to-be-processed service of the $k^{th}$ service type, where $$\sum_{i=1}^{N} l_i^k = M_k,$$

$1 \le l_i^k \le M_k - N + 1$, $$i^* = \underset{i \in S}{\operatorname{argmax}} \frac{T_i + \Delta T_i}{l_i^k},$$

$S = \{1, 2, L, N\}$, N is a total quantity of protocol layers in the protocol stack, i is any value ranging from 1 to N, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, $P_k$ is a quantity of data packets of the to-be-processed service of the $k^{th}$ service type, $M_k$ is the second quantity, and $\min F(l_1^k, l_2^k, L, l_N^k)$ indicates the minimum sum of delays in protocol processing on the to-be-processed service of the $k^{th}$ service type at all the protocol layers by using the allocated resources.

With reference to the tenth possible implementation, in a twelfth possible implementation, the resource allocation module is specifically configured to determine, according to a formula $$\min F(l_1^k, l_2^k, L, l_N^k) = \frac{P_k}{\sum_{i=1}^{N}(T_i + \Delta T_i) + \left(\frac{P_k}{l_{i^*}^k} - 1\right)(T_{i^*} + \Delta T_{i^*})},$$

a third quantity $l_i^k$ of protocol processing modules that are allocated to an $i^{th}$ protocol layer in the protocol stack and that are corresponding to a resource used for processing the to-be-processed service of the $k^{th}$ service type, where $$\sum_{i=1}^{N} l_i^k = M_k,$$

$1 \le l_i^k \le M^k - N + 1$, $$i^* = \underset{i \in S}{\operatorname{argmax}} \frac{T_i + \Delta T_i}{l_i},$$

$S = \{1, 2, L, N\}$, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, $P_k$ is a quantity of data packets of the to-be-processed service of the $k^{th}$ service type, $M_k$ is the second quantity, and $\min F(l_1^k, l_2^k, L, l_N^k)$ indicates the maximum data throughput in protocol processing on the to-be-processed service of the $k^{th}$ service type at all the protocol layers by using the allocated resources.

With reference to any one of the sixth to the twelfth possible implementations, in a thirteenth possible implementation, the service information is further used to determine average service traffic of the $k^{th}$ service type; and the service processing module is specifically configured to determine the second quantity $M_k$ according to a formula $$M_k = \left\lceil \frac{R_k}{\sum_{i=1}^{K} R_i} M \right\rceil,$$

where $$\sum_{k=1}^{K} M_k = M,$$

M is the first quantity, K is a total quantity of the at least one service type, $R_k$ is the average service traffic of the $k^{th}$ service type, and $R_i$ is average service traffic of the $i^{th}$ service type.

With reference to any one of the second aspect, or the first to the thirteenth possible implementations, in a fourteenth possible implementation, the system further includes a resource pool, where the resource pool includes a third receiving module, an available-resource determining module, and a third sending module, where the resource determining module is specifically configured to send an available-resource request message to the resource pool; the third receiving module is configured to receive the available-resource request message sent by the resource determining module; the available-resource determining module is configured to determine an available resource on the SDP network, where the available resource is used for resource allocation of the protocol stack; the third sending module is configured to send the available-resource feedback message to the resource determining module, where the available-resource feedback message carries information about the available resource; and the resource determining module is further configured to receive the available-resource feedback message sent by the resource pool.

With reference to any one of the second aspect, or the first to the fourteenth possible implementations, in a fifteenth possible implementation, when the SDP network is a distributed network, the available resource is a local available resource of the protocol stack deployment node; or when the SDP network is a centralized network, the available resource is a global available resource on the SDP network.

According to a third aspect, a resource allocation system on a Software Defined Protocol (SDP) network is provided, where the system includes a protocol stack deployment node and a resource allocator; the resource allocator includes a first receiver, a first processor, and a first transmitter; the protocol stack deployment node is configured to send a resource request message to the resource allocator, where the resource request message carries information about a protocol stack deployed on the protocol stack deployment node; the first receiver is configured to receive the resource request message sent by the protocol stack deployment node; the first processor is configured to determine information about an available resource on the SDP network, where the available resource is used for resource allocation of the protocol stack; the first processor is further configured to determine, according to the information about the protocol stack and the information about the available resource, information about a resource allocated to each protocol layer in the protocol stack; the first transmitter is configured to send a resource feedback message to the protocol stack deployment node, where the resource feedback message carries the information about the resource allocated to each protocol layer in the protocol stack; and the protocol stack deployment node is further configured to receive the resource feedback message sent by the resource allocator.

With reference to the third aspect, in a first possible implementation, the information about the available resource includes a first quantity of protocol processing modules corresponding to the available resource; and the information about the resource allocated to each protocol layer in the protocol stack includes a second quantity of protocol processing modules corresponding to the allocated resource.

With reference to the first possible implementation, in a second possible implementation, the information about the protocol stack includes a processing capability of a protocol processing module at each protocol layer in the protocol stack; and the first processor is specifically configured to determine the second quantity according to the processing capability of the protocol processing module at each protocol layer in the protocol stack and the first quantity, so as to obtain an optimal processing capability of performing protocol processing at all the protocol layers by using allocated resources.

With reference to the second possible implementation, in a third possible implementation, the processing capability of the protocol processing module at each protocol layer includes a processing delay of the protocol processing module at each protocol layer in the protocol stack, a transmission delay between protocol processing modules at two adjacent protocol layers, and a quantity of data packets of at least one to-be-processed service; and the first processor is specifically configured to determine the second quantity according to the processing delay, the transmission delay, the quantity of data packets of the to-be-processed service, and the first quantity, so as to obtain a minimum sum of delays in protocol processing at all the protocol layers by using the allocated resources, or a maximum data throughput in protocol processing at all the protocol layers by using the allocated resources.

With reference to the third possible implementation, in a fourth possible implementation, the first processor is specifically configured to determine, according to a formula $$\min F(l_1, l_2, L, l_N) = \sum_{i=1}^{N}(T_i + \Delta T_i) + \left(\frac{P}{l_{i^*}} - 1\right)(T_{i^*} + \Delta T_{i^*}),$$

a second quantity $l_i$ of protocol processing modules corresponding to a resource allocated to an $i^{th}$ protocol layer, where $$\sum_{i=1}^{N} l_i = M,$$

$1 \le l_i \le M-N+1$, $$i^* = \underset{i \in S}{\operatorname{argmax}} \frac{T_i + \Delta T_i}{l_i},$$

S={1, 2, L, N}, N is a total quantity of protocol layers in the protocol stack; i is any value ranging fro to N is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the first quantity, and min F($l_1$, $l_2$, L, $l_N$) indicates the minimum sum of delays in protocol processing at all the protocol layers by using the allocated resources.

With reference to the third possible implementation, in a fifth possible implementation, the first processor is specifically configured to determine, according to a formula $$\min F(l_1, l_2, L, l_N) = \frac{P}{\sum_{i=1}^{N}(T_i + \Delta T_i) + \left(\frac{P}{l_{i*}} - 1\right)(T_{i*} + \Delta T_{i*})},$$

a quantity of protocol processing modules allocated to each protocol layer, where $$\sum_{i=1}^{N} l_i = M,$$

$1 \leq l_i \leq M-N+1$, $$i^* = \underset{i \in S}{\operatorname{argmax}} \frac{T_i + \Delta T_i}{l_i},$$

$S=\{1, 2, L, N\}$, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the quantity of protocol processing modules corresponding to the available resource, $l_i$ is a quantity of protocol processing modules allocated to the $i^{th}$ protocol layer, and min $F(l_1, l_2, L, l_N)$ indicates the maximum data throughput in protocol processing at all the protocol layers by using the allocated resources.

With reference to the third aspect, in a sixth possible implementation, the resource request message carries service information of at least one service type on the protocol stack deployment node and information about a protocol stack corresponding to each service type; and the first processor is specifically configured to: determine, according to the service information and the information about the available resource, information about a resource allocated to a $k^{th}$ service type of the at least one service type; and determine, according to the information about the resource allocated to the $k^{th}$ service type and information about a protocol stack corresponding to the $k^{th}$ service type, information about a resource that is allocated to each protocol layer in the protocol stack and that is used for processing a to-be-processed service of the $k^{th}$ service type, where the information about the resource allocated to each protocol layer in the protocol stack includes the information about the resource that is allocated to each protocol layer in the protocol stack and that is used for processing the to-be-processed service of the $k^{th}$ service type.

With reference to the sixth possible implementation, in a seventh possible implementation, the system further includes a service processor, where the service processor includes a second receiver, a second processor, and a second transmitter; the first transmitter is further configured to send a resource pre-request message to the service processor, where the resource pre-request message carries the service information and the information about the available resource; the second receiver is configured to receive the resource pre-request message sent by the resource allocator; the second processor is configured to determine, according to the service information and the information about the available resource, the information about the resource allocated to the $k^{th}$ service type; the second transmitter is configured to send a resource pre-request feedback message to the resource allocator, where the resource pre-request feedback message carries the information about the resource allocated to the $k^{th}$ service type; the first receiver is further configured to receive the resource pre-request feedback message sent by the service processor; and the first processor is specifically configured to determine, according to the information about the protocol stack and the information about the resource allocated to the $k^{th}$ service type, the information about the resource that is allocated to each protocol layer in the protocol stack and that is used for processing the to-be-processed service of the $k^{th}$ service type.

With reference to the seventh possible implementation, in an eighth possible implementation, the information about the available resource includes a first quantity of protocol processing modules corresponding to the available resource; the information about the resource allocated to the $k^{th}$ service type includes a second quantity of protocol processing modules corresponding to the resource allocated to the $k^{th}$ service type; and the information about the resource that is allocated to each protocol layer in the protocol stack and that is used for processing the to-be-processed service of the $k^{th}$ service type includes a third quantity of protocol processing modules corresponding to the resource that is allocated to each protocol layer in the protocol stack and that is used for processing the to-be-processed service of the $k^{th}$ service type.

With reference to the eighth possible implementation, in a ninth possible implementation, the information about the protocol stack includes a processing capability of a protocol processing module at each protocol layer in the protocol stack; and the first processor is specifically configured to determine the third quantity according to a processing capability of a protocol processing module at each protocol layer in the protocol stack and the second quantity, so as to obtain an optimal processing capability of performing protocol processing on the to-be-processed service of the $k^{th}$ service type at all the protocol layers by using the allocated resources.

With reference to the ninth possible implementation, in a tenth possible implementation, the processing capability of the protocol processing module at each protocol layer in the protocol stack includes a processing delay of the protocol processing module at each protocol layer in the protocol stack, a transmission delay between protocol processing modules at two adjacent protocol layers, and a quantity of data packets of the to-be-processed service of the $k^{th}$ service type; and the first processor is specifically configured to determine the third quantity according to the processing delay, the transmission delay, the quantity of data packets of the to-be-processed service, and the second quantity, so as to obtain a minimum sum of delays in protocol processing on the to-be-processed service of the $k^{th}$ service type at all the protocol layers by using the allocated resources, or a maximum data throughput in protocol processing on the to-be-processed service of the $k^{th}$ service type at all the protocol layers by using the allocated resources.

With reference to the tenth possible implementation, in an eleventh possible implementation, the first processor is specifically configured to determine, according to a formula $$\min F(l_1^k, l_2^k, L, l_N^k) = \sum_{i=1}^{N}(T_i + \Delta T_i) + \left(\frac{P^k}{l_{i*}^k} - 1\right)(T_{i*} + \Delta T_{i*}),$$

a third quantity $l_i^k$ of protocol processing modules that are allocated to an $i^{th}$ protocol layer in the protocol stack and that are corresponding to a resource used for processing the to-be-processed service of the $k^{th}$ service type, where $$\sum_{i=1}^{N} l_i^k = M_k,$$

$1 \leq l_i^k \leq M_k - N + 1$, $$i^* = \arg\max_{i \in S} \frac{T_i + \Delta T_i}{l_i^k},$$

$S = \{1, 2, L, N\}$, N is a total quantity of protocol layers in the protocol stack, i is any value ranging from 1 to N, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, $P_k$ is a quantity of data packets of the to-be-processed service of the k service type, $M_k$ is the second quantity, and $F(l_1^k, l_2^k, L, l_N^k)$ indicates the minimum sum of delays in protocol processing on the to-be-processed service of the k h service type at all the protocol layers by using the allocated resources.

With reference to the tenth possible implementation, in a twelfth possible implementation, the first processor is specifically configured to determine, according to a formula $$\min F(l_1^k, l_2^k, L, l_N^k) = \frac{P_k}{\sum_{i=1}^{N}(T_i + \Delta T_i) + \left(\frac{P_k}{l_{i*}^k} - 1\right)(T_{i*} + \Delta T_{i*})},$$

a third quantity $l_i^k$ of protocol processing modules that are allocated to an $i^{th}$ protocol layer in the protocol stack and that are corresponding to a resource used for processing the to-be-processed service of the $k^{th}$ service type, where $$\sum_{i=1}^{N} l_i^k = M_k,$$

$1 \leq l_i^k \leq M^k - N + 1$, $$i^* = \arg\max_{i \in S} \frac{T_i + \Delta T_i}{l_i},$$

$S = \{1, 2, L, N\}$, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, $P_k$ is a quantity of data packets of the to-be-processed service of the $k^{th}$ service type, $M_k$ is the second quantity, and $F(l_1^k, l_2^k, L, l_N^k)$ indicates the maximum data throughput in protocol processing on the to-be-processed service of the $k^{th}$ service type at all the protocol layers by using the allocated resources.

With reference to any one of the sixth to the twelfth possible implementations, in a thirteenth possible implementation, the service information is further used to determine average service traffic of the $k^{th}$ service type; and the second processor is specifically configured to determine the second quantity $M_k$ according to a formula $$M_k = \left\lceil \frac{R_k}{\sum_{i=1}^{K} R_i} M \right\rceil,$$

where $$\sum_{i=1}^{K} M_k = M,$$

M is the first quantity, K is a total quantity of the at least one service type, $R_k$ is the average service traffic of the $k^{th}$ service type, and $R_i$ is average service traffic of the $i^{th}$ service type.

With reference to any one of the third aspect, or the first to the thirteenth possible implementations, in a fourteenth possible implementation, the system further includes a resource pool, where the resource pool includes a third receiver, a third processor, and a third transmitter, where the first transmitter is further configured to send an available-resource request message to the resource pool; the third receiver is configured to receive the available-resource request message sent by the resource allocation module; the third processor is configured to determine the available resource on the SDP network, where the available resource is used for resource allocation of the protocol stack; the third transmitter is configured to send the available-resource feedback message to the resource allocator, where the available-resource feedback message carries the information about the available resource; and the first receiver is further configured to receive the available-resource feedback message sent by the resource pool.

With reference to any one of the third aspect, or the first to the fourteenth possible implementations, in a fifteenth possible implementation, when the SDP network is a distributed network, the available resource is a local available resource of the protocol stack deployment node; or when the SDP network is a centralized network, the available resource is a global available resource on the SDP network.

According to the resource allocation method and system on the SDP network in embodiments of the present disclosure, the resource allocator determines, after receiving the resource request message, the resource allocated to each protocol layer in the protocol stack from the available resource on the network, and then notifies the protocol stack deployment node of the information about the allocated resource by using the resource feedback message. In this way, the protocol stack deployment node can perform resource configuration of the protocol layer according to the resource feedback message. Therefore, in the embodiments of the present disclosure, resource allocation of all the protocol layers is implemented by using the resource request message and the resource feedback message that are exchanged between the resource allocator and the protocol stack deployment node.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 1 is a schematic architecture diagram of a Software Defined Protocol (SDP) network according to the present disclosure;

FIG. 2 is a schematic flowchart of a resource allocation method on an SDP network according to an embodiment of the present disclosure;

FIG. 4 is a flowchart of a resource allocation method on an SDP network according to another embodiment of the present disclosure;

FIG. 5 is a flowchart of a resource allocation method on an SDP network according to another embodiment of the present disclosure;

DESCRIPTION OF EMBODIMENTS

Figure 3:
FIG. 3 is a schematic diagram of a resource allocation process on an SDP network according to another embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

FIG. 1 is a schematic architecture diagram of an SDP network to which an embodiment of the present disclosure can be applied. The SDP network may include a protocol stack deployment node 110 and a resource allocator 120.

A protocol stack is deployed on the protocol stack deployment node 110. The protocol stack deployment node 110 is configured to: request the resource allocator 120 to allocate a resource, and then perform protocol processing on a service on the protocol stack deployment node according to resource allocation information sent by the resource allocator 120. The resource allocator 120 is configured to: determine information about an available resource on the network according to a resource request of the protocol stack deployment node 110, and send the resource allocation information to the protocol stack deployment node 110.

Optionally, the SDP network may further include a resource pool 130. The resource pool 130 is configured to: determine the available resource on the network according to the available-resource request sent by the resource allocator 120, and send the information about the available resource to the resource allocator 120.

Optionally, the SDP network may further include a service processor 140. The service processor 140 is configured to: determine, according to a resource pre-allocation request sent by the resource allocator 120, resource allocation information used when protocol processing is performed for different service types, and send the resource allocation information to the resource allocator 120.

The schematic architecture diagram of the SDP network shown in FIG. 1 is merely a possible architecture diagram of the SDP network, and shall not constitute any limitation on the present disclosure.

FIG. 2 is a schematic flowchart of a resource allocation method 200 on an SDP network according to an embodiment of the present disclosure. The method 200 may be executed by the resource allocator 120 in FIG. 1.

At S210, the resource allocator receives a resource request message sent by a protocol stack deployment node, where the resource request message carries information about a protocol stack deployed on the protocol stack deployment node.

At S220, the resource allocator determines information about an available resource on the SDP network, where the available resource is used for resource allocation of the protocol stack.

At S230, the resource allocator determines, according to the information about the protocol stack and the information about the available resource, information about a resource allocated to each protocol layer in the protocol stack.

At S240, the resource allocator sends a resource feedback message to the protocol stack deployment node, where the resource feedback message carries the information about the resource allocated to each protocol layer in the protocol stack.

According to the resource allocation method on the SDP network in this embodiment of the present disclosure, the resource allocator determines, according to information about all protocol layers in the protocol stack after receiving the resource request message, the resource allocated to each protocol layer in the protocol stack from the available resource on the network, and then notifies the protocol stack deployment node of the information about the allocated resource by using the resource feedback message. In this way, the protocol stack deployment node can perform resource configuration of the protocol layer according to the resource feedback message. Therefore, in this embodiment of the present disclosure, resource allocation of all the protocol layers is implemented by using the resource request message and the resource feedback message that are exchanged between the resource allocator and the protocol stack deployment node.

In the resource allocation method on the SDP network in this embodiment of the present disclosure, when the SDP network is a distributed network, a resource on the network is a resource managed in a distributed manner, and in this case, the determined available resource may be a local available resource of the protocol stack deployment node; or when the SDP network is a centralized network, a resource on the network is a resource managed in a centralized manner, and in this case, the determined available resource may be a global resource on the entire SDP network.

In the following, a more detailed example is used to describe a resource allocation process according to an embodiment of the present disclosure. FIG. 3 is a schematic diagram of the resource allocation process 300 according to this embodiment of the present disclosure. In the embodiment in FIG. 3, a protocol stack has been deployed on a protocol stack deployment node 310, and then a resource needs to be allocated to each protocol layer, so that the allocated resource can be used at the protocol layer in the protocol stack to perform protocol processing on a service.

Therefore, in S321, the protocol stack deployment node 310 sends a resource request message to a resource allocator 320, where the resource request message carries information about the protocol stack deployed on the protocol stack deployment node, and the resource allocator 320 receives the resource request message.

The resource allocator 320 determines information about an available resource on the SDP network after receiving the resource request message, and then determines a resource allocated to each protocol layer in the protocol stack according to the information about the protocol stack that is carried in the received resource request message and the information about the available resource on the SDP network.

In S322, the resource allocator 320 sends a resource feedback message to the protocol stack deployment node 310, where the resource feedback message carries information about a resource allocated to each protocol layer. The protocol stack deployment node 310 receives the resource feedback message sent by the resource allocator 320, and then configures the resource for the protocol layer according to the information about the resource allocated to each protocol layer that is carried in the resource feedback message.

In this embodiment of the present disclosure, the resource request message received by the resource allocator 320 and the resource feedback message sent by the resource allocator 320 may carry other information, and this is not limited in the present disclosure.

On the SDP network, a resource may have many different representation forms, for example, information such as a storage space size, a quantity of processed resources, or a time occupied for processing a resource. Certainly, the resource may be represented in another form, and no limitation is imposed on a resource representation form in the present disclosure. For example, at different layers, different protocol processing modules corresponding to the protocol layers are used to perform protocol processing on a service data stream. The protocol processing modules need to use a specific resource to process the data stream. Therefore, a quantity of protocol processing modules may also be used to represent the available resource on the SDP network.

In an embodiment of the present disclosure, optionally, the protocol processing modules at different protocol layers may use a same quantity of resources to perform protocol processing. In this case, the available resource on the SDP network may be quantified as a specified quantity of protocol processing modules according to a quantity of resources used by one protocol processing module in performing protocol processing, and then the protocol processing modules obtained by means of quantification are allocated to corresponding protocol layers according to a processing capability of each protocol layer in processing the data stream by using a corresponding protocol processing module. A quantity of protocol processing modules allocated to each protocol layer determines the resource allocated to each protocol layer. That is, in this embodiment of the present disclosure, the quantity of protocol processing modules is allocated to each protocol layer to indirectly allocate the resource to each protocol layer.

Therefore, optionally, the information about the available resource on the SDP network may include a quantity of protocol processing modules corresponding to the available resource. The resource allocator may determine the quantity of protocol processing modules corresponding to the available resource on the SDP network.

In this case, when determining, according to the information about the protocol stack and the information about the available resource, the resource allocated to each protocol layer in the protocol stack, the resource allocator may determine, according to the information about the protocol stack and the quantity of protocol processing modules corresponding to the available resource on the SDP network, the quantity of protocol processing modules allocated to each protocol layer in the protocol stack. For ease of description, the quantity of protocol processing modules corresponding to the available resource on the SDP network is referred to as a first quantity.

Correspondingly, the information, carried in the resource feedback message sent by the resource allocator to a protocol stack processor, about the resource allocated to each protocol layer may be the quantity of protocol processing modules corresponding to the resource allocated to each protocol layer.

After receiving the resource feedback message, the protocol stack deployment node may configure the resource for each protocol layer according to the quantity of protocol processing modules allocated to each protocol layer.

In this embodiment of the present disclosure, a processing capability of a protocol processing module at each protocol layer may be a data stream processing delay of the protocol processing module and an output delay in data transmission between protocol processing modules used at two adjacent protocol layers, or may be another capability such as a throughput. No limitation is imposed on a specific representation form of a processing capability in the present disclosure.

The information about the protocol stack may include a processing capability of a protocol processing module at each protocol layer. In this case, when determining, according to the information about the protocol stack and the first quantity, the quantity of protocol processing modules allocated to each protocol layer in the protocol stack, the resource allocator may determine, according to the processing capability of the protocol processing module at each protocol layer and the first quantity, the quantity of protocol processing modules allocated to each protocol layer.

In the resource allocation method on the SDP network in this embodiment of the present disclosure, the information about the protocol stack may include the processing capability of the protocol processing module at each protocol layer, that is, a resource is allocated to each protocol layer in the protocol stack according to a maximum processing capability of the protocol layer. Therefore, according to the resource allocation method on the SDP network in this embodiment of the present disclosure, a total protocol processing capability of a system can be improved.

Optionally, the information about the protocol stack includes a processing delay of the protocol processing module at each protocol layer, a transmission delay between protocol processing modules at two adjacent protocol layers of all the protocol layers, and a quantity of data packets of at least one to-be-processed service. In this case, the resource allocator is specifically configured to determine, according to all processing delays, all transmission delays, the quantity of data packets of the to-be-processed service, and the first quantity, the second quantity of protocol processing modules allocated to each protocol layer.

When determining, according to a processing capability of a protocol processing module at a protocol layer and the first quantity, the resource allocated to each protocol layer, the resource allocator may further use another condition to help determine the quantity of protocol processing modules allocated to each protocol layer.

For example, the resource allocator determines, according to a processing capability of a protocol processing module at a protocol layer and the first quantity, the resource allocated to each protocol layer, so as to obtain an optimal processing capability of performing protocol processing at all the protocol layers by using allocated resources.

Optionally, if a representation form of a processing capability of a protocol processing module is a throughput, a representation form of an optimal processing capability is correspondingly a maximum total throughput; if a representation form of a processing capability of a protocol processing module is a transmission delay or a processing delay, a representation form of an optimal processing capability is correspondingly a minimum sum of processing delays.

Optionally, the information about the protocol stack that is carried in the resource request message sent by the protocol stack deployment node may include a processing delay of the protocol processing module at each protocol layer on the protocol deployment node, a transmission delay in data transmission between protocol processing modules at two adjacent protocol layers, and a quantity of data packets of a to-be processed service at the protocol stack. In this case, the resource allocator may determine, according to all processing delays, all transmission delays, the quantity of data packets of the to-be-processed service, and the first quantity, the quantity of protocol processing modules allocated to each protocol layer, so as to obtain a minimum sum of delays in protocol processing at all the protocol layers by using allocated resources.

In this embodiment of the present disclosure, the quantity of protocol processing modules is allocated to each protocol layer by satisfying the condition of the minimum sum of the delays in protocol processing at all the protocol layers by using the allocated resources corresponding to the quantity of protocol processing modules, so as to optimize a capability of performing protocol processing at all the protocol layers in a protocol stack.

In this embodiment of the present disclosure, alternatively, the quantity of protocol processing modules may be allocated to each protocol layer by making a sum of delays in protocol processing at all the protocol layers by using allocated available resources be a processing delay threshold or be within a delay range, and this is not limited in the present disclosure.

Optionally, when the resource allocator determines, according to processing delays, transmission delays, the quantity of data packets of the to-be-processed service, and the quantity of protocol processing modules corresponding to the available resource, the quantity of protocol processing modules allocated to each protocol layer, specifically, a formula $$\min F(l_1, l_2, L, l_N) = \sum_{i=1}^{N} (T_i + \Delta T_i) + \left(\frac{P_k}{l_{i^*}} - 1\right)(T_{i^*} + \Delta T_{i^*})$$

may be used for implementation, where $$\sum_{i=1}^{N} l_i = M,$$

$1 \leq l_i \leq M-N+1$, $$i^* = \underset{i \in S}{\operatorname{argmax}} \frac{T_i + \Delta T_i}{l_i},$$

and S={1, 2, L, N}.

In the foregoing formula, N is a total quantity of protocol layers in the protocol stack; i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the i* protocol layer and a protocol processing module at an $(i+1)^{th}$ protocol layer, $\Delta T_N$ is zero, P is the quantity of data packets of the to-be-processed service, M is the quantity of protocol processing modules corresponding to the available resource, $l_i$ is a quantity of protocol processing modules allocated to the $i^{th}$ protocol layer, and min $F(l_1, l_2, L, l_N)$ indicates the minimum sum of delays in protocol processing at all the protocol layers by using the allocated resources.

The formula in the foregoing method is merely an optional formula, and the quantity of protocol processing modules allocated to each protocol layer may be calculated by using another formula that can meet a requirement; and this is not limited in the present disclosure.

For example, the quantity of protocol processing modules allocated to each protocol layer may be determined according to a formula $$\min F(l_1, l_2, L, l_N) = \frac{P}{\sum_{i=1}^{N}(T_i + \Delta T_i) + \left(\frac{P}{l_{i*}} - 1\right)(T_{i*} + \Delta T_{i*})},$$

where $$\sum_{i=1}^{N} l_i = M,$$

$1 \leq l_i \leq M-N+1$, $$i^* = \underset{i \in S}{\operatorname{argmax}} \frac{T_i + \Delta T_i}{l_i},$$

$S = \{1, 2, L, N\}$, N is a total quantity of protocol layers in the protocol stack, i is any value ranging from 1 to N, S is a set including positive integers 1 to N, $i^*$ is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the quantity of protocol processing modules corresponding to the available resource, S is a quantity of protocol processing modules allocated to the $i^{th}$ protocol layer, and min $F(l_1, l_2, L, l_N)$ indicates the maximum data throughput in protocol processing at all the protocol layers by using the allocated resources.

For example, the protocol stack deployed on the protocol stack deployment node may include a Media Access Control (MAC) layer, a Radio Link Control (RLC) layer, a Packet Data Convergence Protocol (PDCP) layer, and an Internet Protocol (IP) layer.

If the available resource is evenly allocated to each protocol layer without considering a processing capability of the protocol layer, a data throughput in protocol processing at all the protocol layers by using the allocated resources is 16.13 mega (M) data packets per second (pps).

According to the resource allocation method in this embodiment of the present disclosure, the available resource on the network is quantified as 100 protocol processing modules, a total of 100 mega data packets are to be processed, a processing delay at a MAC layer is 1.55-mega data per microsecond (μs), a processing delay at an RLC layer in an Acknowledgment Mode (AM) is 1.43-mega data per μs, a processing delay at a PDCP layer is 0.03-mega data per μs, and a processing delay at an IP layer is 0.11-mega data per μs. In addition, assuming that a transmission delay between two adjacent protocol layers is 0, after the protocol processing modules are allocated to all protocol layers according to the foregoing processing capabilities of all the protocol layers, a data throughput in protocol processing at all the protocol layers by using resources corresponding to the protocol processing modules is 31.60 mega data packets per second, that is, about 1.96 times of a data throughput of 16.13 mega data packets per second that is obtained when resources are evenly allocated.

In the foregoing embodiment, other parameters keep unchanged, and only a processing delay at the RLC layer is changed to a processing delay that is in an unacknowledgment mode (Unacknowledgement Module, UM) and that is obtained when a packet header length of a data block is 10 bits, that is, 1.18-mega data per microsecond. In this case, after the protocol processing modules are allocated to all protocol layers according to the foregoing processing capabilities of all the protocol layers, a data throughput in protocol processing at all the protocol layers by using resources corresponding to the allocated protocol processing modules is 34.18 mega data packets per second, that is, about 2.12 times of a data throughput of 16.13 mega data packets per second that is obtained when resources are evenly allocated.

For another example, in the foregoing embodiment, other parameters keep unchanged, and only a processing delay at the RLC layer is changed to a processing delay that is in UM and that is obtained when a packet header length of a data block is 5 bits, that is, 0.7-mega data per microsecond. In this case, after the protocol processing modules are allocated to all protocol layers according to the foregoing processing capabilities of all the protocol layers, a data throughput in protocol processing at all the protocol layers by using resources corresponding to the allocated protocol processing modules is 41.28 mega data packets per second, that is, about 2.56 times of a data throughput of 16.13 mega data packets per second that is obtained when resources are evenly allocated.

It can be learned from the foregoing several embodiments of the present disclosure, in the resource allocation system on the SDP network in this embodiment of the present disclosure, a maximum system processing capability that is obtained when a resource is allocated to a protocol layer according to a processing capability of the protocol layer may be 2.56 times of a system processing capability that is obtained when a resource is not allocated according to the processing capability of the protocol layer, that is, the system processing capability is greatly improved.

FIG. 4 shows a resource allocation method 400 on an SDP network according to an embodiment of the present disclosure. The SDP network includes a protocol stack deployment node and a resource allocator. The method may be executed by the resource allocator 120 in FIG. 1.

At S410, the resource allocator receives a resource request message sent by the protocol stack deployment node, where the resource request message carries service information of at least one service type on the protocol stack deployment node and information about a protocol stack corresponding to each service type. At S420, the resource allocator determines information about an available resource on the SDP network, where the available resource is used for resource allocation of the protocol stack. At S430, the resource allocator determines information about a resource allocated to a $k^{th}$ service type according to the service information and the information about the available resource. At S440, the resource allocator determines, according to the information about the protocol stack and the information about the resource allocated to the $k^{th}$ service type, information about a resource that is allocated to each protocol layer in the protocol stack and that is used for processing a to-be-processed service of the $k^{th}$ service type. At S450, the resource allocator sends a resource feedback message to the protocol stack deployment node, where the resource feedback message carries the information about the resource that is allocated to each protocol layer in the protocol stack and that is used for processing the to-be-processed service of the $k^{th}$ service type.

According to the resource allocation method in this embodiment of the present disclosure, the available resource is allocated to each service type, and then among resources allocated to each service type, a resource used for processing a to-be-processed service of the service type is allocated to each protocol layer in a protocol stack corresponding to the service type, so that the resource allocated to the protocol layer by the resource allocator is detailed from a perspective of each service type.

FIG. 5 shows a resource allocation method 500 on an SDP network according to an embodiment of the present disclosure. The SDP network includes a protocol stack deployment node, a resource allocator, and a service processor. The method 500 may be executed by the resource allocator 120 in FIG. 1.

At S510, the resource allocator receives a resource request message sent by the protocol stack deployment node, where the resource request message carries service information of at least one service type on the protocol stack deployment node and information about a protocol stack corresponding to each of these service types.

At S520, the resource allocator determines information about an available resource on the SDP network, where the information about the available resource is used for resource allocation of the protocol stack.

At S530, the resource allocator sends a resource pre-request message to the service processor, where the resource pre-request message carries the service information and the information about the available resource, so that the service processor determines, according to the service information and the information about the available resource, a resource allocated to a $k^{th}$ service type of these service types.

At S540, the resource allocator receives a resource pre-request feedback message sent by the service processor, where the resource pre-request feedback message carries information about the resource allocated to the $k^{th}$ service type.

At S550, the resource allocator determines, according to the information about the protocol stack and the information about the resource allocated to the $k^{th}$ service type, a resource that is allocated to each protocol layer in the protocol stack and that is used for processing a to-be-processed service of the k service type.

At S560, the resource allocator sends a resource feedback message to the protocol stack deployment node, where the resource feedback message carries the resource that is allocated to each protocol layer in the protocol stack and that is used for processing the to-be-processed service of the $k^{th}$ service type.

Figure 6:
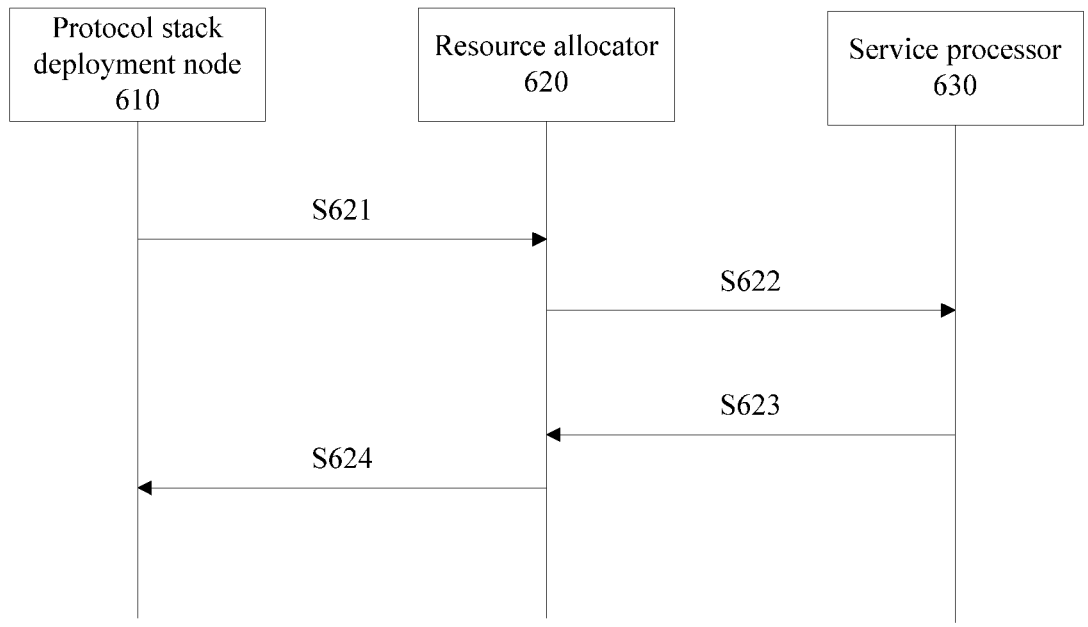
FIG. 6 is a flowchart of a resource allocation process on an SDP network according to another embodiment of the present disclosure.

In the following, a more detailed example is used to describe a resource allocation process according to an embodiment of the present disclosure. FIG. 6 is a schematic diagram of a resource allocation process 600 on an SDP network according to an embodiment of the present disclosure. The SDP network includes a protocol stack deployment node 610, a resource allocator 620, and a service processor 630. In the embodiment in FIG. 6, a protocol stack has been deployed on the protocol stack deployment node 610, and then a resource for processing a to-be-processed service of each service type needs to be allocated to each protocol layer on the protocol stack deployment node.

Therefore, in S621, the protocol stack deployment node 610 sends a resource request message to the resource allocator 620, where the resource request message carries service information of at least one service type on the protocol stack deployment node and information about a protocol stack corresponding to each service type. The resource allocator 620 receives the resource request message.

The resource allocator 620 determines information about an available resource on the SDP network, where the available resource is used for resource allocation of the protocol stack.

Then in S622, the resource allocator 620 sends a resource pre-request message to the service processor 630, where the resource pre-request message carries the service information and the information about the available resource. The service processor 630 receives the resource pre-request message, and determines, according to the service information and the information about the available resource that are carried in the resource pre-request message, a resource allocated to a $k^{th}$ service type.

In S623, the service processor 630 sends a resource pre-request feedback message to the resource allocator 620, where the resource pre-request feedback message carries information about the resource allocated to the $k^{th}$ service type. The resource allocator 620 receives the resource pre-request feedback message sent by the service processor 630.

After receiving the resource pre-request feedback message, the resource allocator 620 determines, according to the information about the resource allocated to the $k^{th}$ service type and information about a protocol stack corresponding to the service type, information about a resource that is allocated to each protocol layer in the protocol stack and that is used for processing a to-be-processed service of the $k^{th}$ service type.

In S624, the resource allocator 620 sends a resource feedback message to the protocol stack deployment node 610, where the resource feedback message carries the information about the resource that is allocated to each protocol layer in the protocol stack and that is used for processing the to-be-processed service of the $k^{th}$ service type. The protocol stack deployment node 610 receives the resource feedback message. After receiving the resource feedback message, the protocol stack deployment node 610 may configure the resource for each protocol layer according to the resource feedback message.

In this embodiment of the present disclosure, the resource allocator and the service processor are used to jointly allocate the resource to each protocol layer.

In this embodiment of the present disclosure, the resource on the network may be quantified as a quantity of protocol processing modules, then, the quantity of protocol processing modules is allocated to each protocol layer, and finally, a resource is allocated to each protocol layer according to the quantity of protocol processing modules at each protocol layer.

Therefore, when determining the information about the available resource, the resource allocator may determine a quantity of protocol processing modules corresponding to the available resource. For ease of description, the quantity of protocol processing modules corresponding to the available resource is referred to as a first quantity for short in the following.

In this case, the information carried in the resource pre-request message sent by the resource allocator to the service processor includes the service information and the first quantity.

After accepting the resource pre-request message, the service processor determines, according to the service information and the first quantity, a quantity of protocol processing modules allocated to the $k^{th}$ service type; and sends the resource pre-request feedback message to the resource allocator, where the resource pre-request feedback message carries the quantity of protocol processing modules allocated to the $k^{th}$ service type. For ease of description, the quantity of protocol processing modules allocated to the $k^{th}$ service type is referred to as a second quantity for short in the following.

The resource allocator receives the resource pre-request feedback message sent by the service processor, and then determines, according to the information about the protocol stack and the second quantity, a quantity of protocol processing modules that are allocated to each protocol layer in the protocol stack and that are used for processing the to-be-processed service of the $k^{th}$ service type. For ease of description, the quantity of protocol processing modules that are allocated to each protocol layer in the protocol stack and that are used for processing the to-be-processed service of the $k^{th}$ service type is referred to as a third quantity for short in the following.

After determining the third quantity, the resource allocator sends a resource feedback message to the protocol stack deployment node, where the resource feedback message carries the third quantity.

The information about the protocol stack may include a processing capability of a protocol processing module at each protocol layer. In this case, when determining, according to the information about the protocol stack and the first quantity, the quantity of protocol processing modules allocated to each protocol layer in the protocol stack, the resource allocator may determine, according to the processing capability of the protocol processing module at each protocol layer and the first quantity, the quantity of protocol processing modules allocated to each protocol layer.

Optionally, the information about the protocol stack includes a processing delay of the protocol processing module at each protocol layer, a transmission delay between protocol processing modules at two adjacent protocol layers of all the protocol layers, and a quantity of data packets of a to-be-processed service of a $k^{th}$ service type. In this case, the resource allocator is specifically configured to determine the third quantity according to all processing delays, all transmission delays, the quantity of data packets of the to-be-processed service, and the second quantity.

When determining the third quantity according to a processing capability of a protocol processing module at a protocol layer and the second quantity, the resource allocator may further use another condition to help determine the third quantity.

For example, the resource allocator determines the third quantity according to a processing capability of a protocol processing module at a protocol layer and the second quantity, so as to obtain an optimal processing capability of performing protocol processing at all the protocol layers by using allocated resources.

Optionally, if a representation form of a processing capability of a protocol processing module is a throughput, a representation form of an optimal processing capability is correspondingly a maximum total throughput; if a representation form of a processing capability of a protocol processing module is a transmission delay or a processing delay, a representation form of an optimal processing capability is correspondingly a minimum sum of processing delays.

In the resource allocation system on the SDP network in this embodiment of the present disclosure, optionally, the information about the protocol stack may include a processing delay of a protocol processing module at each protocol layer, a transmission delay between protocol processing modules at two adjacent protocol layers of all protocol layers, and a quantity of data packets of a to-be-processed service of a $k^{th}$ service type. In this case, the resource allocator may determine, according to all processing delays, all transmission delays, the quantity of data packets of the to-be-processed service, and the quantity of protocol processing modules allocated to the k service type, a quantity of protocol processing modules allocated to each protocol layer in a protocol stack corresponding to each service type and that is used for processing the to-be-processed service of the k service type, so as to obtain a minimum sum of delays in protocol processing on the to-be-processed service of the $k^{th}$ service type at all protocol layers by using allocated resources.

In the resource allocation system on the SDP network in this embodiment of the present disclosure, a quantity of protocol processing modules used for protocol processing on the to-be-processed service of the $k^{th}$ service type is allocated to each protocol layer, and the sum of the delays in protocol processing on the to-be-processed service of the $k^{th}$ service type at all the protocol layers by using the allocated resources is minimum, so that a processing capability of the entire protocol layer is optimized.

In this embodiment of the present disclosure, alternatively, the delay in performing protocol processing at all the protocol layers by using the allocated available resource may be a processing delay threshold or a delay range that is set as required, and this is not limited in the present disclosure.

Optionally, when determining the third quantity, the resource allocator may specifically determine, according to a formula $$\min F(l_1^k, l_2^k, L, l_N^k) = \sum_{i=1}^{N}(T_i + \Delta T_i) + \left(\frac{P^k}{l_{i^*}^k} - 1\right)(T_{i^*} + \Delta T_{i^*}),$$

the quantity $l_i^k$ of protocol processing modules that are allocated to each protocol layer in the protocol stack and that are used for processing the to-be-processed service of the $k^{th}$ service type, where $$\sum_{i=1}^{N} l_i^k = M_k,$$

$1 \le l_i^k \le M_k - N + 1$, $$i^* = \arg\max_{i \in S} \frac{T_i + \Delta T_i}{l_i^k},$$

S={1, 2, L, N}, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, $P_k$ is a quantity of data packets of the to-be-processed service of the $k^{th}$ service type, $M_k$ is the quantity of protocol processing modules allocated to the $k^{th}$ service type, and min $F(1_1^k, 1_2^k, L, 1_N^k)$ indicates a minimum sum of delays in protocol processing on the to-be-processed service of the $k^{th}$ service type at all the protocol layers by using the allocated resources.

The formula in the foregoing embodiment is merely an optional formula, and the quantity of protocol processing modules allocated to each protocol layer may be calculated by using another formula that can meet a requirement; and this is not limited in the present disclosure.

For example, a third quantity $l_i^k$ of protocol processing modules that are allocated to an $i^{th}$ protocol layer in the protocol stack and that are corresponding to a resource used for processing the to-be-processed service of the $k^{th}$ service type may be further determined according to a formula $$\min F(l_1^k, l_2^k, L, l_N^k) = \frac{P_k}{\sum_{i=1}^{N}(T_i + \Delta T_i) + \left(\frac{P_k}{l_{i^*}^k} - 1\right)(T_{i^*} + \Delta T_{i^*})},$$

where $$\sum_{i=1}^{N} l_i^k = M_k,$$

$1 \leq l_i^k \leq M_k - N + 1$, $$i^* = \underset{i \in S}{\arg\max} \frac{T_i + \Delta T_i}{l_i},$$

S={1, 2, L, N}, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is a quantity of data packets of the to-be-processed service of the $k^{th}$ service type, M is the second quantity, and min $F(1_1^k, 1_2^k, L, 1_N^k)$ indicates a maximum data throughput in protocol processing on the to-be-processed service of the $k^{th}$ service type at all the protocol layers by using the allocated resources.

Optionally, in the method 200, the method 400, and the method 500, when the resource allocator determines the information about the available resource in a resource pool, the resource allocator may send the available-resource request message to the resource pool, so that the resource pool determines information about the available resource on the SDP network; then the resource allocator may receive the available-resource feedback message sent by the resource pool, where the available-resource feedback message carries the information about the available resource. In an embodiment, the information about the available resource may be the quantity of protocol processing modules corresponding to the available resource.

In this case, in the resource allocation method on the SDP network according to this embodiment of the present disclosure, a resource pool is used to determine the information about the available resource on the SDP network, so as to improve the resource allocation capability of the resource allocator.

Figure 7:
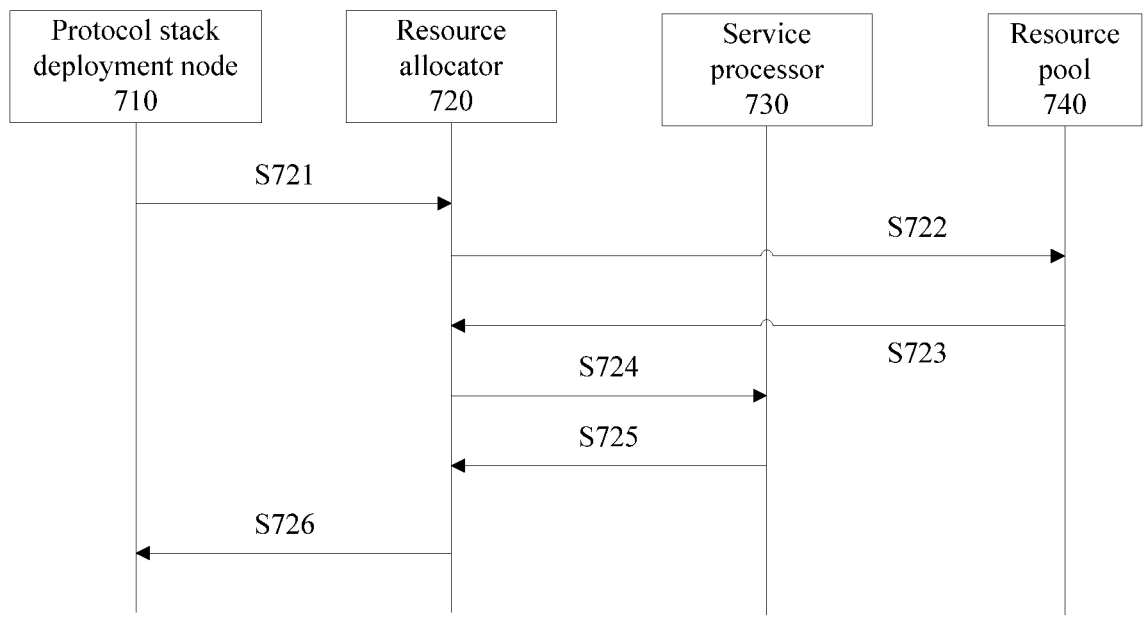
FIG. 7 is a flowchart of a resource allocation process on an SDP network according to another embodiment of the present disclosure.

In the following, a more detailed example is used to describe a resource allocation process according to an embodiment of the present disclosure. FIG. 7 is a schematic diagram of a resource allocation process 700 on an SDP network according to this embodiment of the present disclosure. The SDP network includes a protocol stack processor 710, a resource allocator 720, a service processor 730, and a resource pool 740. In the embodiment in FIG. 7, a protocol stack has been deployed on the protocol stack deployment node 710, and then a resource for processing a to-be-processed service of each service type needs to be allocated to each protocol layer on the protocol stack deployment node.

S721. The protocol stack deployment node 710 sends a resource request message to the resource allocator 720, where the resource request message carries service information of at least one service type on the protocol stack deployment node and information about a protocol stack corresponding to each of these service types; and the resource allocator 720 receives the resource request message.

S722. The resource allocator 720 sends an available-resource request message to the resource pool 740; and the resource pool 740 receives the available-resource request message, and then determines information about an available resource on the SDP network, where the available resource is used for resource allocation of the protocol stack, and the information about the available resource may be a quantity of resource processing modules corresponding to the available resource.

S723. The resource pool 740 sends an available-resource feedback message to the resource allocator 720, where the available-resource feedback message carries the information about the available resource; and the resource allocator 720 receives the available-resource feedback message.

S724. The resource allocator 720 sends a resource pre-request message to the service processor 730, where the resource pre-request message carries the service information and the information about the available resource; and the service processor 730 receives the resource pre-request message, and then determines, according to the service information and the information about the available resource, a resource allocated to a $k^{th}$ service type of these service types; and when the information about the available resource is a quantity of protocol processing modules corresponding to the available resource, the service processor 730 determines, according to the service information and the quantity of protocol processing modules corresponding to the available resource, a quantity of protocol processing modules allocated to the $k^{th}$ service type.

S725. The service processor 730 sends a resource pre-request feedback message to the resource allocator 720; the resource allocator 720 receives the resource pre-request feedback message sent by the service processor 730, where the resource pre-request feedback message carries information about an available resource allocated to the $k^{th}$ service type; and then, the resource allocator 720 determines, from the available resource allocated to the $k^{th}$ service type according to the information about the protocol stack, an available resource that is allocated to each protocol layer in the protocol stack and that is used for processing a to-be-processed service of the $k^{th}$ service type.

S726. The resource allocator 720 sends a resource feedback message to the protocol stack deployment node, where the resource feedback message carries information about an available resource allocated to each protocol layer; and the protocol stack deployment node 710 receives the resource feedback message, and then allocates an available resource to each protocol layer from the available resource according to the resource feedback message.

The foregoing describes, according to FIG. 2 to FIG. 7, in detail the resource allocation method and process on the SDP network. The following describes, with reference to FIG. 8 to FIG. 12, in detail a resource allocation system on an SDP network.

Figure 8:
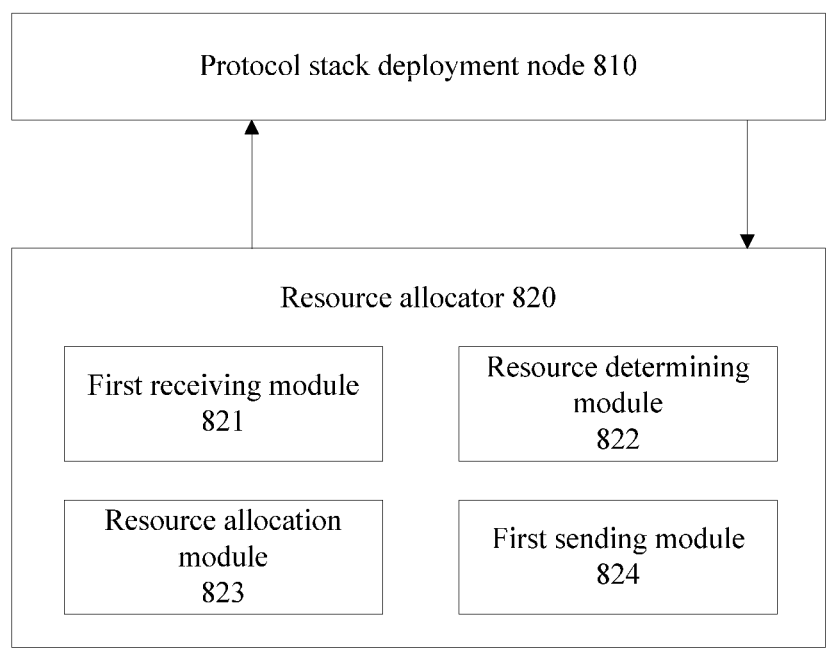
FIG. 8 is a schematic block diagram of a resource allocation system on an SDP network according to an embodiment of the present disclosure.

The resource allocation system on the SDP network in FIG. 8 includes a protocol stack deployment node 810 and a resource allocator 820. The resource allocator 820 includes a first receiving module 821, a resource determining module 822, a resource allocation module 823, and a first sending module 824.

The protocol stack deployment node 810 is configured to send a resource request message to the resource allocator 820. The resource request message carries information about a protocol stack on the protocol stack deployment node 810.

The first receiving module 821 is configured to receive the resource request message sent by the protocol stack deployment node 810. The resource determining module 822 is configured to determine information about an available resource on the SDP network, where the available resource is allocated to the protocol layer. The resource allocation module 823 is configured to determine, from the available resource according to the information about the protocol stack, an available resource allocated to each protocol layer in the protocol stack. The first sending module 824 is configured to send a resource feedback message to the protocol stack deployment node 810, where the resource feedback message carries information about the available resource allocated to each protocol layer in the protocol stack.

The protocol stack deployment node 810 is further configured to receive the resource feedback message sent by the resource allocator 820.

According to the resource allocation system on the SDP network in this embodiment of the present disclosure, the resource allocator accepts the request sent by the protocol stack deployment node and determines the available resource on the network; then determines, from the available resource on the network according to the information about the protocol stack carried in the request, the resource allocated to each protocol layer in the protocol stack; and then sends, to the protocol stack deployment node, the information about the resource allocated to each protocol layer, so that the protocol stack deployment node performs resource configuration according to the information about the allocated resource.

In the resource allocation system on the SDP network in this embodiment of the present disclosure, when the SDP network is a distributed network, a resource on the network is a resource managed in a distributed manner, and in this case, the determined available resource may be a local available resource of the protocol stack deployment node; or when the SDP network is a centralized network, a resource on the network is a resource managed in a centralized manner, and in this case, the determined available resource may be a global resource on the entire SDP network.

Optionally, the resource determining module 822 is specifically configured to determine a first quantity of protocol processing modules corresponding to an available resource in the resource pool, where the available resource is allocated to a protocol layer. The resource allocation module is specifically configured to determine, according to the information about the protocol stack and the first quantity, a second quantity of protocol processing modules allocated to each protocol layer in the protocol stack.

The information about the protocol stack may include a processing capability of a protocol processing module at each protocol layer. In this case, when determining, according to the information about the protocol stack and the first quantity, the quantity of protocol processing modules allocated to each protocol layer in the protocol stack, the resource allocator may determine, according to the processing capability of the protocol processing module at each protocol layer and the first quantity, the quantity of protocol processing modules allocated to each protocol layer.

In the resource allocation system on the SDP network in this embodiment of the present disclosure, the information about the protocol stack may include the processing capability of the protocol processing module at each protocol layer, that is, a resource is allocated to each protocol layer in the protocol stack according to a maximum processing capability of the protocol layer. Therefore, according to the resource allocation system on the SDP network in this embodiment of the present disclosure, a total protocol processing capability of a system can be improved.

Optionally, the information about the protocol stack includes a processing delay of the protocol processing module at each protocol layer, a transmission delay between protocol processing modules at two adjacent protocol layers of all the protocol layers, and a quantity of data packets of at least one to-be-processed service. In this case, the resource allocator is specifically configured to determine, according to all processing delays, all transmission delays, the quantity of data packets of the to-be-processed service, and the first quantity, the second quantity of protocol processing modules allocated to each protocol layer.

When determining, according to a processing capability of a protocol processing module at a protocol layer and the first quantity, the resource allocated to each protocol layer, the resource allocator may further use another condition to help determine the quantity of protocol processing modules allocated to each protocol layer.

For example, the resource allocator determines, according to a processing capability of a protocol processing module at a protocol layer and the first quantity, the resource allocated to each protocol layer, so as to obtain an optimal processing capability of performing protocol processing at all the protocol layers by using allocated resources.

Optionally, if a representation form of a processing capability of a protocol processing module is a throughput, a representation form of an optimal processing capability is correspondingly a maximum total throughput; if a representation form of a processing capability of a protocol processing module is a transmission delay or a processing delay, a representation form of an optimal processing capability is correspondingly a minimum sum of processing delays.

Optionally, the information about the protocol stack includes a processing delay of the protocol processing module at each protocol layer, a transmission delay between protocol processing modules at two adjacent protocol layers of all the protocol layers, and a quantity of data packets of at least one to-be-processed service. In this case, the resource allocator is specifically configured to determine, according to all processing delays, all transmission delays, the quantity of data packets of the to-be-processed service, and the first quantity, the second quantity of protocol processing modules allocated to each protocol layer, so as to obtain a minimum sum of delays in protocol processing at all the protocol layers by using allocated resources.

Optionally, when determining the second quantity, the resource allocation module may determine, according to a formula $$\min F(l_1, l_2, L, l_N) = \sum_{i=1}^{N}(T_i + \Delta T_i) + \left(\frac{P}{l_{i^*}} - 1\right)(T_{i^*} + \Delta T_{i^*}),$$

a quantity $l_i$ of protocol processing modules allocated to an $i^{th}$ protocol layer, where $$\sum_{i=1}^{N} l_i = M,$$

$1 \leq l_i \leq M-N+1$, $$i^* = \underset{i \in S}{\arg\max} \frac{T_i + \Delta T_i}{l_i},$$

$S=\{1, 2, L, N\}$, N is a total quantity of protocol layers in the protocol stack; i is any value ranging from 1 to N, S is a set including positive integers 1 to N, $i^{th}$ is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{*th}$ protocol layer, $\Delta T_N$ is zero, P is the quantity of data packets of the to-be-processed service, M is the first quantity, and min $F(l_1, l_2, L, l_N)$ indicates the minimum sum of delays in protocol processing at all the protocol layers by using the allocated resources.

Optionally, when determining the second quantity, the resource allocation module may further determine, according to a formula $$\min F(l_1, l_2, L, l_N) = \frac{P}{\sum_{i=1}^{N}(T_i + \Delta T_i) + \left(\frac{P}{l_{i^*}} - 1\right)(T_{i^*} + \Delta T_{i^*})},$$

the quantity of protocol processing modules allocated to each protocol layer, where $$\sum_{i=1}^{N} l_i = M,$$

$1 \leq l_i \leq M-N+1$, $$i^* = \underset{i \in S}{\arg\max} \frac{T_i + \Delta T_i}{l_i},$$

$S=\{1, 2, L, N\}$, N is a total quantity of protocol layers in the protocol stack, i is any value ranging from 1 to N, S is a set including positive integers 1 to N, $i^*$ is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the quantity of protocol processing modules corresponding to the available resource, $l_i$ is a quantity of protocol processing modules allocated to the $i^{th}$ protocol layer, and min $F(l_1, l_2, L, l_N)$ indicates the maximum data throughput in protocol processing at all the protocol layers by using allocated resources.

For example, the protocol stack deployed on the protocol stack deployment node may include a Media Access Control (Media Access Control, MAC) layer, a radio link control (Radio Link Control, RLC) layer, a Packet Data Convergence Protocol (Packet Data Convergence Protocol, PDCP) layer, and an Internet Protocol (Internet Protocol, IP) layer.

If the available resource is evenly allocated to each protocol layer without considering a processing capability of the protocol layer, a data throughput in protocol processing at all the protocol layers by using the allocated resources is 16.13 mega (Mega, M) data packets per second (packet per second, pps).

According to the resource allocation method in this embodiment of the present disclosure, the available resource on the network is quantified as 100 protocol processing modules, a total of 100 mega data packets are to be processed, a processing delay at a MAC layer is 1.55-mega data per microsecond (μs), a processing delay at an RLC layer in an acknowledgment mode (Acknowledgement Module, AM) is 1.43-mega data per μs, a processing delay at a PDCP layer is 0.03-mega data per μs, and a processing delay at an IP layer is 0.11-mega data per μs. In addition, assuming that a transmission delay between two adjacent protocol layers is 0, after the protocol processing modules are allocated to all protocol layers according to the foregoing processing capabilities of all the protocol layers, a data throughput in protocol processing at all the protocol layers by using resources corresponding to the protocol processing modules is 31.60 mega data packets per second, that is, about 1.96 times of a data throughput of 16.13 mega data packets per second that is obtained when resources are evenly allocated.

In the foregoing embodiment, other parameters keep unchanged, and only a processing delay at the RLC layer is changed to a processing delay that is in an Unacknowledgment Mode (UM) and that is obtained when a packet header length of a data block is 10 bits, that is, 1.18-mega data per microsecond; in this case, after the protocol processing modules are allocated to all protocol layers according to the foregoing processing capabilities of all the protocol layers, a data throughput in protocol processing at all the protocol layers by using resources corresponding to the allocated protocol processing modules is 34.18 mega data packets per second, that is, about 2.12 times of a data throughput of 16.13 mega data packets per second that is obtained when resources are evenly allocated.

For another example, in the foregoing embodiment, other parameters keep unchanged, and only a processing delay at the RLC layer is changed to a processing delay that is in UM and that is obtained when a packet header length of a data block is 5 bits, that is, 0.7-mega data per microsecond. In this case, after the protocol processing modules are allocated to all protocol layers according to the foregoing processing capabilities of all the protocol layers, a data throughput in protocol processing at all the protocol layers by using resources corresponding to the allocated protocol processing modules is 41.28 mega data packets per second, that is, about 2.56 times of a data throughput of 16.13 mega data packets per second that is obtained when resources are evenly allocated.

It can be learned from the foregoing several embodiments of the present disclosure, in the resource allocation system on the SDP network in this embodiment of the present disclosure, a maximum system processing capability that is obtained when a resource is allocated to a protocol layer according to a processing capability of the protocol layer may be 2.56 times of a system processing capability that is obtained when a resource is not allocated according to the processing capability of the protocol layer, that is, the system processing capability is greatly improved.

The resource request message received by the first receiving module 821 may further carry service information of at least one service type on the protocol stack deployment node and information about a protocol stack corresponding to each of these service types.

In this case, the resource allocation module is specifically configured to determine, according to the service information and the information about the available resource that are received by the first receiving module 821, a resource allocated to a $k^{th}$ service type, and then determines, according to the resource allocated to the $k^{th}$ service type and information about a protocol stack corresponding to the service type, a resource that is allocated to each protocol layer in the protocol stack and that is used for processing a to-be-processed service of the $k^{th}$ service type.

The resource feedback information sent by the first sending module 824 may further carry information about the available resource that is allocated to each protocol layer in the protocol stack and that is used for processing the to-be-processed service of the $k^{th}$ service type.

Figure 9:
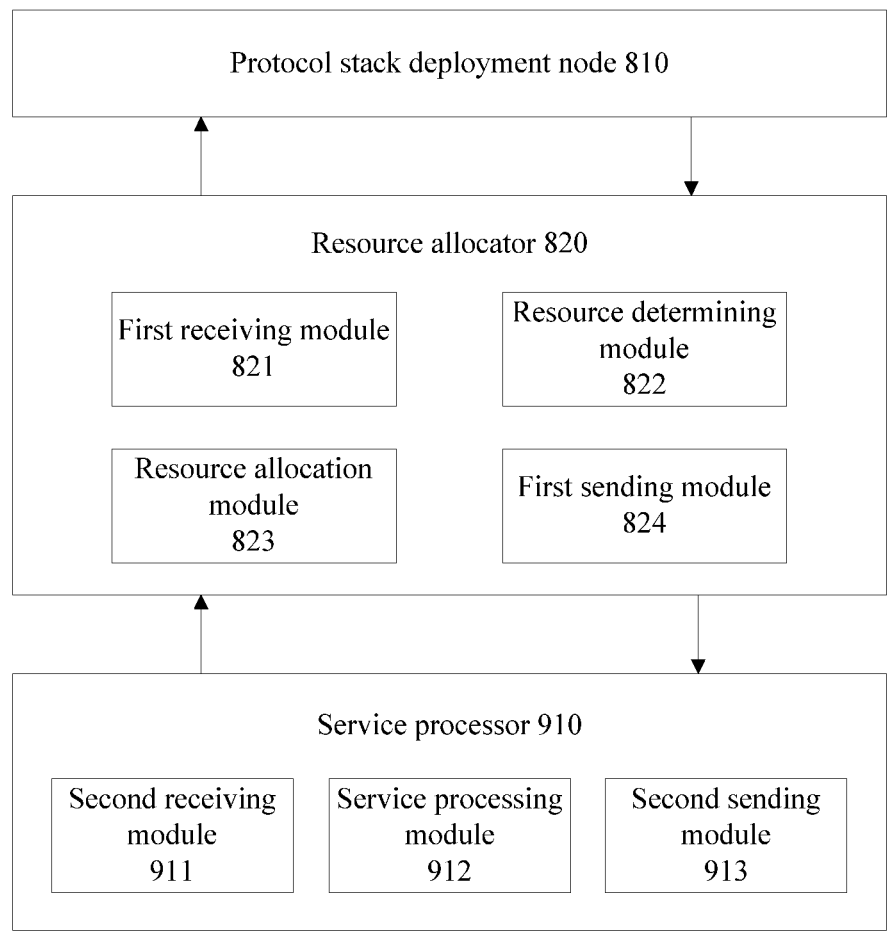
FIG. 9 is a schematic block diagram of a resource allocation system on an SDP network according to another embodiment of the present disclosure.

FIG. 9 is a schematic block diagram of a resource allocation system on an SDP network according to an embodiment of the present disclosure. In the system shown in FIG. 9, a component the same as or similar to that in the system shown in FIG. 8 is represented by a same name in the drawing, and details are not repeated herein. A major difference from the system shown in FIG. 8 lies in that the system shown in FIG. 9 further includes a service processor 910. The service processor 910 includes a second receiving module 911, a service processing module 912, and a second sending module 913.

In this case, the first sending module 824 is further configured to send a resource pre-request message to the service processor 910. The resource pre-request message carries service information and information about an available resource.

The second receiving module 911 is configured to receive the resource pre-request message sent by the resource allocator 820. The service processing module 912 is configured to determine, according to the service information and the information about the available resource, information about a resource allocated to a $k^{th}$ service type. The second sending module 913 is configured to send a resource pre-request feedback message to the resource allocator 820. The resource pre-request feedback message carries the information about the resource allocated to the $k^{th}$ service type.

The first receiving module 821 is further specifically configured to receive the resource pre-request feedback message sent by the second sending module 913. The resource allocation module 823 is specifically configured to determine, according to the information about the resource allocated to the $k^{th}$ service type and information about a protocol stack corresponding to the service type, information about a resource that is allocated to each protocol layer in the protocol stack and that is used for processing a to-be-processed service of the $k^{th}$ service type.

Optionally, the resource determining module 822 may be specifically configured to determine a first quantity of protocol processing modules corresponding to the available resource. In this case, the information about the available resource is the first quantity.

In addition, the service processing module 912 is specifically configured to determine, according to the service information and the first quantity, a second quantity of protocol processing modules allocated to the $k^{th}$ service type.

The resource allocation module 823 is specifically configured to determine, according to the second quantity of protocol processing modules allocated to the $k^{th}$ service type and the information about the protocol stack corresponding to the service type, a third quantity of protocol processing modules that are allocated to each protocol layer in the protocol stack and that are used for processing the to-be-processed service of the $k^{th}$ service type.

In this case, the resource feedback message that is sent by the first sending module 824 and that is received by the protocol stack deployment node 810 carries the third quantity of protocol processing modules that are allocated to each protocol layer in the protocol stack and that are used for processing the to-be-processed service of the $k^{th}$ service type.

The information about the protocol stack may include a processing capability of a protocol processing module at each protocol layer. In this case, when determining, according to the information about the protocol stack and the first quantity, a quantity of protocol processing modules allocated to each protocol layer in the protocol stack, the resource allocator may determine, according to the processing capability of the protocol processing module at each protocol layer and the first quantity, the quantity of protocol processing modules allocated to each protocol layer.

Optionally, the information about the protocol stack includes a processing delay of the protocol processing module at each protocol layer, a transmission delay between protocol processing modules at two adjacent protocol layers of all the protocol layers, and a quantity of data packets of a to-be-processed service of a $k^{th}$ service type. In this case, the resource allocator is specifically configured to determine the third quantity according to all processing delays, all transmission delays, the quantity of data packets of the to-be-processed service, and the second quantity.

When determining the third quantity according to a processing capability of a protocol processing module at a protocol layer and the second quantity, the resource allocator may further use another condition to help determine the third quantity.

For example, the resource allocator determines the third quantity according to a processing capability of a protocol processing module at a protocol layer and the second quantity, so as to obtain an optimal processing capability of performing protocol processing at all the protocol layers by using allocated resources.

Optionally, if a representation form of a processing capability of a protocol processing module is a throughput, a representation form of an optimal processing capability is correspondingly a maximum total throughput; if a representation form of a processing capability of a protocol processing module is a transmission delay or a processing delay, a representation form of an optimal processing capability is correspondingly a minimum sum of processing delays.

Optionally, the information about the protocol stack includes a processing delay of a protocol processing module at each protocol layer, a transmission delay between protocol processing modules at two adjacent protocol layers of all protocol layers, and a quantity of data packets of a to-be-processed service of the service type. In this case, the resource allocation module is specifically configured to determine, according to all processing delays, all transmission delays, the quantity of data packets of the to-be-processed service, and the second quantity of protocol processing modules allocated to the $k^{th}$ service type, the third quantity of protocol processing modules that are allocated to each protocol layer in the protocol stack and that are used for processing the to-be-processed service of the $k^{th}$ service type, so as to obtain a minimum sum of delays in protocol processing at all the protocol layers by using allocated resources.

Optionally, when determining the third quantity, the resource allocation module may determine, according to a formula $$\min F(l_1^k, l_2^k, L, l_N^k) = \sum_{i=1}^{N} (T_i + \Delta T_i) + \left(\frac{P_k}{l_{i^*}^k} - 1\right)(T_{i^*} + \Delta T_{i^*}),$$

the quantity $l_i^k$ of protocol processing modules that are allocated to each protocol layer in the protocol stack and that are used for processing the to-be-processed service of the $k^{th}$ service type, where $$\sum_{i=1}^{N} l_i^k = M_k,$$

$1 \leq l_i^k \leq M_k - N + 1$, $$i^* = \underset{i \in S}{\arg\max} \frac{T_i + \Delta T_i}{l_i^k},$$

S={1, 2, L, N}, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero-, $P_k$ is a quantity of data packets of the to-be-processed service of the $k^{th}$ service type, $M_k$ is the quantity of protocol processing modules allocated to the $k^{th}$ service type, and min $F(l_1^k, l_2^k, L, l_N^k)$ indicates the minimum sum of delays in protocol processing at all the protocol layers by using the allocated resources.

Optionally, when determining the third quantity, the resource allocation module may further determine, according to a formula $$\min F(l_1^k, l_2^k, L, l_N^k) = \frac{P_k}{\sum_{i=1}^{N} (T_i + \Delta T_i) + \left(\frac{P_k}{l_{i^*}^k} - 1\right)(T_{i^*} + \Delta T_{i^*})},$$

a third quantity $l_i^k$ of protocol processing modules that are allocated to an $i^{th}$ protocol layer in the protocol stack and that are corresponding to a resource used for processing the to-be-processed service of the $k^{th}$ service type, where $$\sum_{i=1}^{N} l_i^k = M_k,$$

$1 \leq l_i^k \leq M_k - N + 1$, $$i^* = \underset{i \in S}{\arg\max} \frac{T_i + \Delta T_i}{l_i^k},$$

S={1, 2, L, N}, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the t protocol layer and a protocol processing module at an $(i+1)^{th}$ protocol layer, $\Delta T_N$ is zero, $P_k$ is a quantity of data packets of the to-be-processed service of the $k^{th}$ service type, M is the second quantity, and min $F(l_1^k, l_2^k, L, l_N^k)$ indicates a maximum data throughput in protocol processing on the to-be-processed service of the $k^{th}$ service type at all the protocol layers by using the allocated resources.

Optionally, the service information may be further used to determine average service traffic of each service type. In this case, the service processing module is specifically configured to determine, according to a formula $$M_k = \left\lceil \frac{R_k}{\sum_{i=1}^{K} R_i} M \right\rceil,$$

a quantity $M_k$ of protocol processing modules allocated to the $k^{th}$ service type, where $$\sum_{i=1}^{K} M_k = M,$$

M is the first quantity, $R_k$ is average service traffic of the $k^{th}$ service type, K is a total quantity of service types, and $R_i$ is average service traffic of an $i^{th}$ service type.

The resource allocation system on the SDP network in this embodiment may further include a resource pool.

The resource pool is configured to: receive an available-resource request message sent by the resource determining module; determine the information about the available resource on the SDP network, where the available resource is allocated to a protocol layer; and send an available-resource feedback message to the resource determining module, where the available-resource feedback message carries the information about the available resource.

In this case, the resource determining module is specifically configured to send the available-resource request message to the resource pool; receive the available-resource feedback message sent by the resource pool; and determine the information about the available resource on the SDP network according to the available-resource feedback message.

Optionally, the protocol stack deployment node may be further configured to configure a resource for each protocol layer from the available resource according to a resource allocation feedback message.

Figure 10:
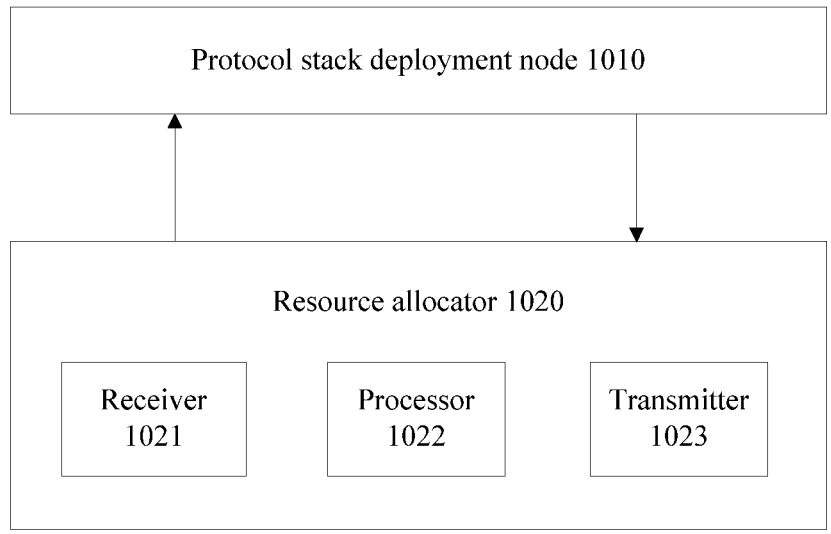
FIG. 10 is a schematic block diagram of a resource allocation system on an SDP network according to another embodiment of the present disclosure.

A resource allocation system on an SDP network in FIG. 10 includes a protocol stack deployment node 1010 and a resource allocator 1020. The resource allocator 1020 includes a receiver 1021, a processor 1022, and a transmitter 1023.

The protocol stack deployment node 1010 is configured to send a resource request message to the resource allocator 1020. The resource request message carries information about a protocol stack on the protocol stack deployment node 1010.

The receiver 1021 is configured to receive the resource request message sent by the protocol stack deployment node 1010. The processor 1022 is configured to determine information about an available resource on the SDP network, where the available resource is allocated to the protocol layer. The processor 1022 is further configured to determine, from the available resource according to the information about the protocol stack, an available resource allocated to each protocol layer in the protocol stack. The transmitter 1023 is configured to send a resource feedback message to the protocol stack deployment node 1010. The resource feedback message carries information about the available resource allocated to each protocol layer in the protocol stack.

The protocol stack deployment node 1010 is further configured to receive the resource feedback message sent by the resource allocator 1020.

According to the resource allocation system on the SDP network in this embodiment of the present disclosure, the resource allocator accepts the request sent by the protocol stack deployment node and determines the available resource on the network; then determines, from the available resource on the network according to the information about the protocol stack carried in the request, the resource allocated to each protocol layer in the protocol stack; and then sends, to the protocol stack deployment node, the information about the resource allocated to each protocol layer, so that the protocol stack deployment node performs resource configuration according to the information about the allocated resource.

Optionally, the processor 1022 is specifically configured to determine a first quantity of protocol processing modules corresponding to an available resource in the resource pool, where the available resource is allocated to a protocol layer; and the resource allocation module is specifically configured to determine, according to the information about the protocol stack and the first quantity, a second quantity of protocol processing modules allocated to each protocol layer in the protocol stack.

The information about the protocol stack may include a processing capability of a protocol processing module at each protocol layer. In this case, when determining, according to the information about the protocol stack and the first quantity, the quantity of protocol processing modules allocated to each protocol layer in the protocol stack, the processor 1022 may be specifically configured to determine, according to the processing capability of the protocol processing module at each protocol layer and the first quantity, the quantity of protocol processing modules allocated to each protocol layer.

Optionally, the information about the protocol stack includes a processing delay of the protocol processing module at each protocol layer, a transmission delay between protocol processing modules at two adjacent protocol layers of all the protocol layers, and a quantity of data packets of at least one to-be-processed service. In this case, the processor 1022 is specifically configured to determine, according to all processing delays, all transmission delays, the quantity of data packets of the to-be-processed service, and the first quantity, the second quantity of protocol processing modules allocated to each protocol layer.

When determining, according to a processing capability of a protocol processing module at a protocol layer and the first quantity, the resource allocated to each protocol layer, the processor 1022 may further use another condition to help determine the quantity of protocol processing modules allocated to each protocol layer.

For example, the processor 1022 determines, according to a processing capability of a protocol processing module at a protocol layer and the first quantity, the resource allocated to each protocol layer, so as to obtain an optimal processing capability of performing protocol processing at all the protocol layers by using allocated resources.

Optionally, if a representation form of a processing capability of a protocol processing module is a throughput, a representation form of an optimal processing capability is correspondingly a maximum total throughput; if a representation form of a processing capability of a protocol processing module is a transmission delay or a processing delay, a representation form of an optimal processing capability is correspondingly a minimum sum of processing delays.

Optionally, the information about the protocol stack includes a processing delay of the protocol processing module at each protocol layer, a transmission delay between protocol processing modules at two adjacent protocol layers of all the protocol layers, and a quantity of data packets of at least one to-be-processed service. In this case, the processor 1022 is specifically configured to determine, according to all processing delays, all transmission delays, the quantity of data packets of the to-be-processed service, and the first quantity, the second quantity of protocol processing modules allocated to each protocol layer, so as to obtain a minimum sum of delays in protocol processing at all the protocol layers by using allocated resources.

Optionally, when determining the second quantity, the processor 1022 may determine, according to a formula $$\min F(l_1, l_2, L, l_N) = \sum_{i=1}^{N} (T_i + \Delta T_i) + \left(\frac{P_k}{l_{i^*}} - 1\right)(T_{i^*} + \Delta T_{i^*}),$$

a quantity $l_i$ of protocol processing modules allocated to an $i^{th}$ protocol layer, where $$\sum_{i=1}^{N} l_i = M,$$

$1 \le l_i \le M-N+1$, $$i^* = \operatorname*{argmax}_{i \in S} \frac{T_i + \Delta T_i}{l_i},$$

$S=\{1, 2, L, N\}$, N is a total quantity of protocol layers in the protocol stack; i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the first quantity, and min $F(l_1, l_2, L, l_N)$ indicates the minimum sum of delays in protocol processing at all the protocol layers by using the allocated resources.

Optionally, when determining the second quantity, the processor 1022 may further determine, according to a formula $$\min F(l_1, l_2, L, l_N) = \frac{P}{\sum_{i=1}^{N} (T_i + \Delta T_i) + \left(\frac{P}{l_{i^*}} - 1\right)(T_{i^*} + \Delta T_{i^*})},$$

the quantity of protocol processing modules allocated to each protocol layer, where $$\sum_{i=1}^{N} l_i = M,$$

$1 \le l_i \le M-N+1$, $$i^* = \operatorname*{argmax}_{i \in S} \frac{T_i + \Delta T_i}{l_i},$$

$S=\{1, 2, L, N\}$, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the quantity of protocol processing modules corresponding to the available resource, $l_i$ is a quantity of protocol processing modules allocated to the $i^{th}$ protocol layer, and min $F(l_1, l_2, L, l_N)$ indicates the maximum data throughput in protocol processing at all the protocol layers by using the allocated resources.

The resource request message received by the receiver 1021 may further carry service information of at least one service type on the protocol stack deployment node and information about a protocol stack corresponding to each of these service types.

In this case, the processor 1022 is specifically configured to determine, according to the service information received by the receiver 1021 and the information about the available resource, a resource allocated to a $k^{th}$ service type, and then determines, according to the resource allocated to the $k^{th}$ service type and information about a protocol stack corresponding to the service type, a resource that is allocated to each protocol layer in the protocol stack and that is used for processing a to-be-processed service of the $k^{th}$ service type.

Correspondingly, the resource feedback information sent by the transmitter 1023 may further carry information about the available resource that is allocated to each protocol layer in the protocol stack and that is used for processing the to-be-processed service of the $k^{th}$ service type.

It should be understood that in this embodiment of the present disclosure, the processor 1022 may be a Central Processing Unit (CPU), the processor 1022 may be further another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

Figure 11:
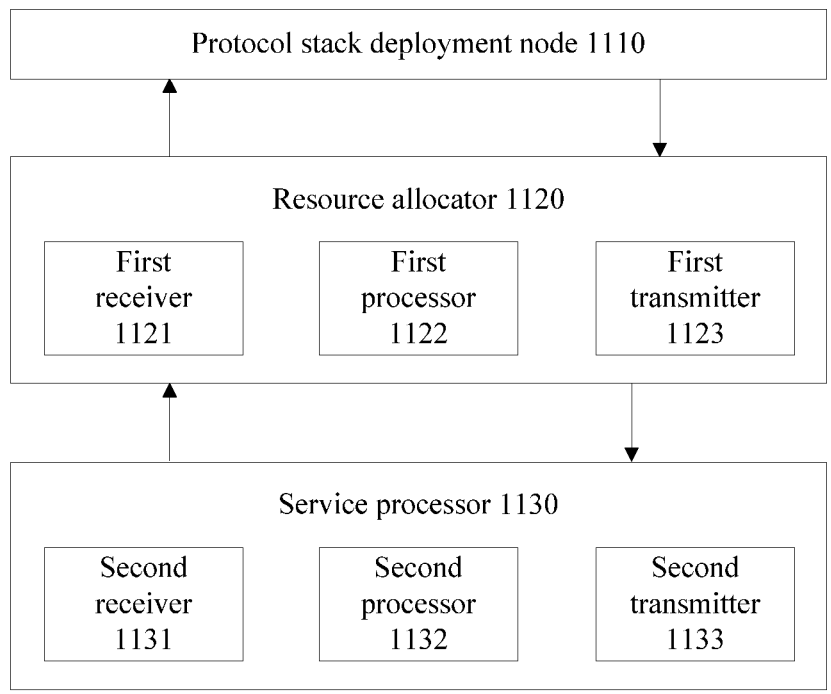
FIG. 11 is a schematic block diagram of a resource allocation system on an SDP network according to another embodiment of the present disclosure.

FIG. 11 is a schematic block diagram of a resource allocation system on an SDP network according to an embodiment of the present disclosure. The system includes a protocol stack deployment node 1110, a resource allocator 1120, and a service processor 1130. The resource allocator 1120 includes a first receiver 1121, a first processor 1122, and a first transmitter 1123. The service processor 1130 includes a second receiver 1131, a second processor 1132, and a second transmitter 1133.

The protocol stack deployment node 1110 is configured to send a resource request message to the resource allocator 1120. The resource request message carries information about a protocol stack on the protocol stack deployment node 1110.

The first receiver 1121 is configured to receive the resource request message sent by the protocol stack deployment node 1110. The first processor 1122 is configured to determine information about an available resource on the SDP network, where the available resource is allocated to the protocol layer. The first transmitter 1123 sends a resource pre-request message to the service processor 1130, where the resource pre-request message carries service information and the information about the available resource.

The second receiver 1131 is configured to receive the resource pre-request message sent by the resource allocator 1120. The second processor 1132 is configured to determine, according to the service information and the information about the available resource, information about a resource allocated to a $k^{th}$ service type. The second transmitter 1133 is configured to send a resource pre-request feedback message to the resource allocator 1120. The resource pre-request feedback message carries the information about the resource allocated to the $k^{th}$ service type.

The first receiver 1121 is further specifically configured to receive the resource pre-request feedback message sent by the service processor 1130. The first processor 1122 is further configured to determine, according to the information about the resource allocated to the $k^{th}$ service type and information about a protocol stack corresponding to the service type, information about a resource that is allocated to each protocol layer in the protocol stack and that is used for processing a to-be-processed service of the $k^{th}$ service type.

The first transmitter 1123 is further configured to send a resource feedback message to the protocol stack deployment node 1110. The resource feedback message carries information about an available resource allocated to each protocol layer in the protocol stack.

The protocol stack deployment node 1110 is further configured to receive the resource feedback message sent by the resource allocator 1120.

Optionally, the first processor 1122 may be specifically configured to determine a first quantity of protocol processing modules corresponding to the available resource. In this case, the information about the available resource is the first quantity.

In addition, the second processor 1132 is specifically configured to determine, according to the service information and the first quantity, a second quantity of protocol processing modules allocated to the $k^{th}$ service type.

The first processor 1122 is further specifically configured to determine, according to the second quantity of protocol processing modules allocated to the $k^{th}$ service type and the information about the protocol stack corresponding to the service type, a third quantity of protocol processing modules that are allocated to each protocol layer in the protocol stack and that are used for processing the to-be-processed service of the $k^{th}$ service type.

In this case, the resource feedback message that is sent by the first transmitter 1123 and that is received by the protocol stack deployment node 1110 carries the third quantity of protocol processing modules that are allocated to each protocol layer in the protocol stack and that are used for processing the to-be-processed service of the $k^{th}$ service type.

The information about the protocol stack may include a processing capability of a protocol processing module at each protocol layer. In this case, when determining, according to the information about the protocol stack and the first quantity, a quantity of protocol processing modules allocated to each protocol layer in the protocol stack, the resource allocator may determine, according to the processing capability of the protocol processing module at each protocol layer and the first quantity, the quantity of protocol processing modules allocated to each protocol layer.

Optionally, the information about the protocol stack includes a processing delay of a protocol processing module at each protocol layer, a transmission delay between protocol processing modules at two adjacent protocol layers of all protocol layers, and a quantity of data packets of a to-be-processed service of the service type. In this case, the first processor 1122 is specifically configured to determine, according to all processing delays, all transmission delays, the quantity of data packets of the to-be-processed service, and the second quantity of protocol processing modules allocated to the $k^{th}$ service type, the third quantity of protocol processing modules that are allocated to each protocol layer in the protocol stack and that are used for processing the to-be-processed service of the $k^{th}$ service type.

When determining the third quantity according to a processing capability of a protocol processing module at a protocol layer and the second quantity, the resource allocator may further use another condition to help determine the third quantity.

For example, the resource allocator determines the third quantity according to a processing capability of a protocol processing module at a protocol layer and the second quantity, so as to obtain an optimal processing capability of performing protocol processing at all the protocol layers by using allocated resources.

Optionally, if a representation form of a processing capability of a protocol processing module is a throughput, a representation form of an optimal processing capability is correspondingly a maximum total throughput; if a representation form of a processing capability of a protocol processing module is a transmission delay or a processing delay, a representation form of an optimal processing capability is correspondingly a minimum sum of processing delays.

Optionally, the information about the protocol stack includes a processing delay of a protocol processing module at each protocol layer, a transmission delay between protocol processing modules at two adjacent protocol layers of all protocol layers, and a quantity of data packets of a to-be-processed service of the service type. In this case, the first processor 1122 is specifically configured to determine, according to all processing delays, all transmission delays, the quantity of data packets of the to-be-processed service, and the second quantity of protocol processing modules allocated to the $k^{th}$ service type, the third quantity of protocol processing modules that are allocated to each protocol layer in the protocol stack and that are used for processing the to-be-processed service of the $k^{th}$ service type, so as to obtain the optimal processing capability of performing protocol processing at all the protocol layers by using the allocated resources.

Optionally, when determining the third quantity, the first processor 1122 may determine, according to a formula $$\min F(l_1^k, l_2^k, L, l_N^k) = \sum_{i=1}^{N} (T_i + \Delta T_i) + \left(\frac{P^k}{l_{i*}^k} - 1\right)(T_{i*} + \Delta T_{i*}),$$

the quantity $l_i^k$ of protocol processing modules that are allocated to each protocol layer in the protocol stack and that are used for processing the to-be-processed service of the $k^{th}$ service type, where $$\sum_{i=1}^{N} l_i^k = M_k,$$

$1 \le l_i^k \le M_k - N + 1$, $$i^* = \underset{i \in S}{\operatorname{argmax}} \frac{T_i + \Delta T_i}{l_i^k},$$

$S=\{1, 2, L, N\}$, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, $P^k$ is a quantity of data packets of the to-be-processed service of the $k^{th}$ service type, $M_k$ is the quantity of protocol processing modules allocated to the $k^{th}$ service type, and min $F(l_1^k, l_2^k, L, l_N^k)$ indicates the minimum sum of delays in protocol processing at all the protocol layers by using the allocated resources.

Optionally, when determining the third quantity, the first processor 1122 may further determine, according to a formula $$\min F(l_1^k, l_2^k, L, l_N^k) = \frac{P_k}{\sum_{i=1}^{N} (T_i + \Delta T_i) + \left(\frac{P_k}{l_{i*}^k} - 1\right)(T_{i*} + \Delta T_{i*})},$$

a third quantity $l_i^k$ of protocol processing modules that are allocated to an $i^{th}$ protocol layer in the protocol stack and that are corresponding to a resource used for processing the to-be-processed service of the $k^{th}$ service type, where $$\sum_{i=1}^{N} l_i^k = M_k,$$

$1 \le l_i^k \le M_k - N + 1$, $$i^* = \underset{i \in S}{\operatorname{argmax}} \frac{T_i + \Delta T_i}{l_i},$$

$S=\{1, 2, L, N\}$, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_i$ is zero, $P_k$ is a quantity of data packets of the to-be-processed service of the $k^{th}$ service type, $M_k$ is the second quantity, and min $F(l_1^k, l_2^k, L, l_N^k)$ indicates a maximum data throughput in protocol processing on the to-be-processed service of the $k^{th}$ service type at all the protocol layers by using the allocated resources.

Optionally, the service information may be further used to determine average service traffic of each service type. In this case, the second processor 1132 is specifically configured to determine, according to a formula $$M_k = \left\lceil \frac{R_k}{\sum_{i=1}^{K} R_i} M \right\rceil,$$

a quantity $M_k$ of protocol processing modules allocated to the $k^{th}$ service type, where $$\sum_{k=1}^{K} M_k = M,$$

M is the first quantity, $R_k$ is average service traffic of the $k^{th}$ service type, K is a total quantity of service types, and $R_i$ is average service traffic of an it service type.

It should be understood that in this embodiment of the present disclosure, the first processor 1122 or the second processor 1132 may be a Central Processing Unit (CPU). The first processor 1122 or the second processor 1132 may be further another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

Figure 12:
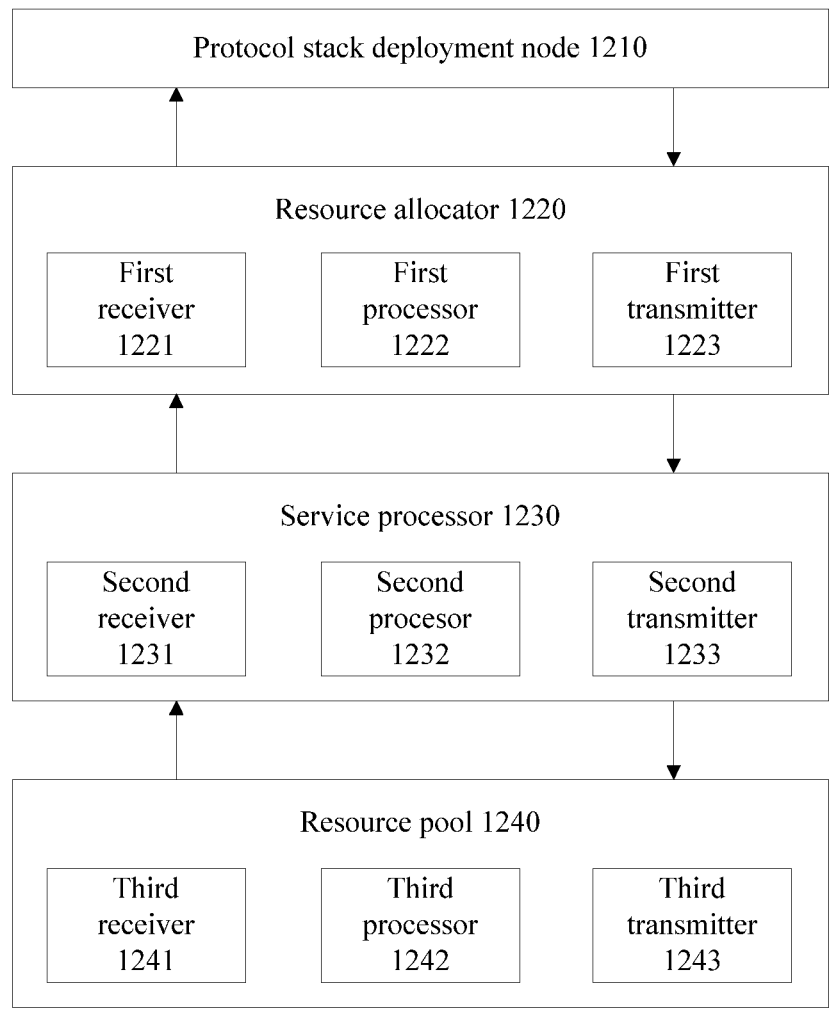
FIG. 12 is a schematic block diagram of a resource allocation system on an SDP network according to another embodiment of the present disclosure.

As shown in FIG. 12, a resource allocation system on an SDP network in an embodiment of the present disclosure may include a protocol stack deployment node 1210, a resource allocator 1220, a service processor 1230, and a resource pool 1240. The resource allocator 1220 includes a first receiver 1221, a first processor 1222, and a first transmitter 1223. The service processor 1230 includes a second receiver 1231, a second processor 1232, and a second transmitter 1233. The resource pool 1240 includes a third receiver 1241, a third processor 1242, and a third transmitter 1243.

The protocol stack deployment node 1210 is configured to send a resource request message to the resource allocator

1220. The resource request message carries information about a protocol stack on the protocol stack deployment node 1210.

The first receiver 1221 is configured to receive the resource request message sent by the protocol stack deployment node 1210. The first transmitter 1223 is configured to send an available-resource request message to the resource pool 1240.

The third receiver 1241 is configured to receive the available-resource request message sent by the resource allocator 1220. The third processor 1242 is configured to determine information about an available resource on the SDP network, where the available resource is allocated to the protocol layer. The third transmitter 1243 is configured to send an available-resource feedback message to the resource allocator 1220. The available-resource feedback message carries the information about the available resource.

The first receiver 1221 is further configured to receive an available-resource feedback message sent by the resource pool 1240. The first transmitter 1223 sends a resource pre-request message to the service processor 1230. The resource pre-request message carries service information and the information about the available resource.

The second receiver 1231 is configured to receive the resource pre-request message sent by the resource allocator 1220. The second processor 1232 is configured to determine, according to the service information and the information about the available resource, information about a resource allocated to a $k^{th}$ service type. The second transmitter 1233 is configured to send a resource pre-request feedback message to the resource allocator 1220. The resource pre-request feedback message carries the information about the resource allocated to the $k^{th}$ service type.

The first receiver 1221 is further specifically configured to receive the resource pre-request feedback message sent by the service processor 1230. The first processor 1222 is further configured to determine, according to the information about the resource allocated to the $k^{th}$ service type and information about a protocol stack corresponding to the service type, information about a resource that is allocated to each protocol layer in the protocol stack and that is used for processing a to-be-processed service of the $k^{th}$ service type.

The first transmitter 1223 is further configured to send a resource feedback message to the protocol stack deployment node 1210. The resource feedback message carries information about an available resource allocated to each protocol layer in the protocol stack.

The protocol stack deployment node 1210 is further configured to receive the resource feedback message sent by the resource allocator 1220.

Optionally, the first processor 1222 may be specifically configured to determine a first quantity of protocol processing modules corresponding to the available resource. In this case, the information about the available resource is the first quantity.

In addition, the second processor 1232 is specifically configured to determine, according to the service information and the first quantity, a second quantity of protocol processing modules allocated to the $k^{th}$ service type.

The first processor 1222 is further specifically configured to determine, according to the second quantity of protocol processing modules allocated to the $k^{th}$ service type and the information about the protocol stack corresponding to the service type, a third quantity of protocol processing modules that are allocated to each protocol layer in the protocol stack and that are used for processing the to-be-processed service of the $k^{th}$ service type.

In this case, the resource feedback message that is sent by the first transmitter 1223 and that is received by the protocol stack deployment node 1210 carries the third quantity of protocol processing modules that are allocated to each protocol layer in the protocol stack and that are used for processing the to-be-processed service of the k h service type.

Optionally, the information about the protocol stack includes a processing delay of a protocol processing module at each protocol layer, a transmission delay between protocol processing modules at two adjacent protocol layers of all protocol layers, and a quantity of data packets of a to-be-processed service of the service type.

In this case, the first processor 1222 is specifically configured to determine, according to all processing delays, all transmission delays, the quantity of data packets of the to-be-processed service, and the second quantity of protocol processing modules allocated to the k service type, the third quantity of protocol processing modules that are allocated to each protocol layer in the protocol stack and that are used for processing the to-be-processed service of the $k^{th}$ service type.

The information about the protocol stack may include a processing capability of a protocol processing module at each protocol layer. In this case, when determining, according to the information about the protocol stack and the first quantity, a quantity of protocol processing modules allocated to each protocol layer in the protocol stack, the resource allocator may determine, according to the processing capability of the protocol processing module at each protocol layer and the first quantity, the quantity of protocol processing modules allocated to each protocol layer.

Optionally, the information about the protocol stack includes a processing delay of a protocol processing module at each protocol layer, a transmission delay between protocol processing modules at two adjacent protocol layers of all protocol layers, and a quantity of data packets of a to-be-processed service of the service type. In this case, the first processor 1222 is specifically configured to determine, according to all processing delays, all transmission delays, the quantity of data packets of the to-be-processed service, and the second quantity of protocol processing modules allocated to the $k^{th}$ service type, the third quantity of protocol processing modules that are allocated to each protocol layer in the protocol stack and that are used for processing the to-be-processed service of the $k^{th}$ service type.

When determining the third quantity according to a processing capability of a protocol processing module at a protocol layer and the second quantity, the resource allocator may further use another condition to help determine the third quantity.

For example, the resource allocator determines the third quantity according to a processing capability of a protocol processing module at a protocol layer and the second quantity, so as to obtain an optimal processing capability of performing protocol processing at all the protocol layers by using allocated resources.

Optionally, if a representation form of a processing capability of a protocol processing module is a throughput, a representation form of an optimal processing capability is correspondingly a maximum total throughput; if a representation form of a processing capability of a protocol processing module is a transmission delay or a processing delay, a representation form of an optimal processing capability is correspondingly a minimum sum of processing delays.

Optionally, the information about the protocol stack includes a processing delay of a protocol processing module at each protocol layer, a transmission delay between protocol processing modules at two adjacent protocol layers of all protocol layers, and a quantity of data packets of a to-be-processed service of the service type. In this case, the first processor 1222 is specifically configured to determine, according to all processing delays, all transmission delays, the quantity of data packets of the to-be-processed service, and the second quantity of protocol processing modules allocated to the $k^{th}$ service type, the third quantity of protocol processing modules that are allocated to each protocol layer in the protocol stack and that are used for processing the to-be-processed service of the $k^{th}$ service type, so as to obtain the optimal processing capability of performing protocol processing at all the protocol layers by using the allocated resources.

Optionally, when determining the third quantity, the first processor 1222 may determine, according to a formula $$\min F(l_1^k, l_2^k, L, l_N^k) = \sum_{i=1}^{N} (T_i + \Delta T_i) + \left(\frac{P_k}{l_{i^*}^k} - 1\right)(T_{i^*} + \Delta T_{i^*}),$$

the quantity $l_i^k$ of protocol processing modules that are allocated to each protocol layer in the protocol stack and that are used for processing the to-be-processed service of the $k^{th}$ service type, where $$\sum_{i=1}^{N} l_i^k = M_k,$$

$1 \le l_i^k \le M_k - N + 1$, $$i^* = \underset{i \in S}{\mathrm{argmax}} \frac{T_i + \Delta T_i}{l_i^k},$$

S={1, 2, L, N}, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the t protocol layer and a protocol processing module at an $(i+1)^{th}$ protocol layer, $\Delta T_N$ is zero, $P_k$ is a quantity of data packets of the to-be-processed service of the k service type, $M_k$ is the quantity of protocol processing modules allocated to the $ks^{th}$ service type, and $\min F(l_1^k, l_2^k, L, l_N^k)$ indicates the minimum sum of delays in protocol processing at all the protocol layers by using the allocated resources.

Optionally, when determining the third quantity, the first processor 1222 may further determine, according to a formula $$\min F(l_1^k, l_2^k, L, l_N^k) = \frac{P_k}{\sum_{i=1}^{N}(T_i + \Delta T_i) + \left(\frac{P_k}{l_{i^*}^k} - 1\right)(T_{i^*} + \Delta T_{i^*})},$$

a third quantity $l_i^k$ of protocol processing modules that are allocated to an $i^{th}$ protocol layer in the protocol stack and that are corresponding to a resource used for processing the to-be-processed service of the $k^{th}$ service type, where $$\sum_{i=1}^{N} l_i^k = M_k,$$

$1 \le l_i^k \le M_k - N + 1$, $$i^* = \underset{i \in S}{\mathrm{argmax}} \frac{T_i + \Delta T_i}{l_i},$$

S={1, 2, L, N}, N is a total quantity of protocol layers in the protocol stack, i is any value ranging from 1 to N, S is a set including positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, $P_k$ is a quantity of data packets of the to-be-processed service of the $k^{th}$ service type, $M_k$ is the second quantity, and $\min F(l_1^k, l_2^k, L, l_N^k)$ indicates a maximum data throughput in protocol processing on the to-be-processed service of the $k^{th}$ service type at all the protocol layers by using the allocated resources.

Optionally, the service information may be further used to determine average service traffic of each service type. In this case, the second processor 1232 is specifically configured to determine, according to a formula $$M_k = \left\lceil \frac{R_k}{\sum_{i=1}^{K} R_i} M \right\rceil,$$

a quantity $M_k$ of protocol processing modules allocated to the $k^{th}$ service type, where $$\sum_{k=1}^{K} M_k = M,$$

M is the first quantity, $R_k$ is average service traffic of the $k^{th}$ service type, K is a total quantity of service types, and $R_i$ is average service traffic of an $i^{th}$ service type.

It should be understood that in this embodiment of the present disclosure, the first processor 1222, the second processor 1232, or the third processor 1242 may be a Central Processing Unit (CPU). The first processor 1222, the second processor 1232, or the third processor 1242 may be further another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A resource allocation method, comprising:
   receiving, by a resource allocator of a Software Defined Protocol (SDP) network, a resource request message sent by a protocol stack deployment node of the SDP network, wherein the resource request message carries information about a protocol stack deployed on the protocol stack deployment node, wherein the information about the protocol stack comprises a processing capability of a protocol processing module at each protocol layer in the protocol stack, wherein the processing capability of the protocol processing module at each protocol layer in the protocol stack comprises a processing delay of the protocol processing module at each protocol layer in the protocol stack, a transmission delay between protocol processing modules at two adjacent protocol layers, and a quantity of data packets of at least one to-be-processed service;
   determining, by the resource allocator, information about an available resource on the SDP network, wherein the available resource is used for resource allocation of the protocol stack, wherein the information about the available resource comprises a first quantity of protocol processing modules corresponding to the available resource;
   determining, by the resource allocator according to the information about the protocol stack and the information about the available resource, information about a resource allocated to each protocol layer in the protocol stack, wherein the information about the resource allocated to each protocol layer in the protocol stack comprises a second quantity of protocol processing modules corresponding to the allocated resource, wherein determining the information about the resource allocated to each protocol layer in the protocol stack further comprises determining, by the resource allocator, the second quantity according to the processing capability of the protocol processing module at each protocol layer in the protocol stack and the first quantity, so as to obtain an optimal processing capability of performing protocol processing at all the protocol layers by using allocated resources; and
   sending, by the resource allocator, a resource feedback message to the protocol stack deployment node, wherein the resource feedback message carries the information about the resource allocated to each protocol layer in the protocol stack.

2. The method according to claim 1,
   the optimal processing capability of performing protocol processing at all the protocol layers by using the allocated resources comprises: a minimum sum of delays in protocol processing at all the protocol layers by using the allocated resources, or a maximum data throughput in protocol processing at all the protocol layers by using the allocated resources.

3. The method according to claim 2, wherein the determining, by the resource allocator, the second quantity according to the processing delay, the transmission delay, the quantity of data packets of the to-be-processed service, and the first quantity, comprises:

determining, by the resource allocator according to a formula $$\min F(l_1, l_2, L, l_N) = \sum_{i=1}^{N}(T_i + \Delta T_i) + \left(\frac{P_k}{l_{i^*}} - 1\right)(T_{i^*} + \Delta T_{i^*}),$$

a second quantity $l_i$ of protocol processing modules allocated to an $i^{th}$ protocol layer, wherein $$\sum_{i=1}^{N} l_i = M,$$

$1 \leq l_i \leq M-N+1$, $$i^* = \underset{i \in S}{\operatorname{argmax}} \frac{T_i + \Delta T_i}{l_i},$$

S={1, 2, L, N}, N is a total quantity of protocol layers in the protocol stack; i is any value ranging from 1 to N, S is a set comprising positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the first quantity, and min $F(l_1, l_2, L, l_N)$ indicates the minimum sum of delays in protocol processing at all the protocol layers by using the allocated resources.

4. The method according to claim 2, wherein the determining, by the resource allocator, the second quantity according to the processing delay, the transmission delay, the quantity of data packets of the to-be-processed service, and the first quantity, so as to obtain a maximum data throughput in protocol processing at all the protocol layers by using the allocated resources, comprises:

determining, by the resource allocator according to a formula $$\min F(l_1, l_2, L, l_N) = \frac{P}{\sum_{i=1}^{N}(T_i + \Delta T_i) + \left(\frac{P}{l_{i^*}} - 1\right)(T_{i^*} + \Delta T_{i^*})},$$

a quantity of protocol processing modules allocated to each protocol layer, wherein $$\sum_{i=1}^{N} l_i = M,$$

$1 \leq l_i \leq M-N+1$, $$i^* = \underset{i \in S}{\operatorname{argmax}} \frac{T_i + \Delta T_i}{l_i},$$

S={1, 2, L, N}, N is a total quantity of protocol layers in the protocol stack, i is any value ranging from 1 to N, S is a set comprising positive integers 1 to N, i* is i in S that maximizes a value of $$\frac{T_i + \Delta T_i}{l_i},$$

$T_i$ is a processing delay of a protocol processing module at an $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, P is the quantity of data packets of the to-be-processed service, M is the quantity of protocol processing modules corresponding to the available resource, $l_i$ is a quantity of protocol processing modules allocated to the $i^{th}$ protocol layer, and min $F(l_1, l_2, L, l_N)$ indicates the maximum data throughput in protocol processing at all the protocol layers by using the allocated resources.

5. The method according to claim 1, wherein the resource request message carries service information of at least one service type on the protocol stack deployment node and information about a protocol stack corresponding to each of the at least one service type; and the determining, by the resource allocator according to the information about the protocol stack and the information about the available resource, information about a resource allocated to each protocol layer in the protocol stack comprises:

determining, by the resource allocator according to the service information and the information about the available resource, information about a resource allocated to a $k^{th}$ service type of the at least one service type; and determining, by the resource allocator according to the information about the resource allocated to the $k^{th}$ service type and information about a protocol stack corresponding to the $k^{th}$ service type, information about a resource that is allocated to each protocol layer in the protocol stack and that is used for processing a to-be-processed service of the $k^{th}$ service type, wherein the information about the resource allocated to each protocol layer in the protocol stack comprises the information about the resource that is allocated to each protocol layer in the protocol stack and that is used for processing the to-be-processed service of the $k^{th}$ service type.

6. The method according to claim 5, wherein the SDP network further comprises a service processor, wherein the determining, by the resource allocator according to the service information and the information about the available resource, information about a resource allocated to $k^{th}$ service type comprises:

sending, by the resource allocator, a resource pre-request message to the service processor, wherein the resource pre-request message carries the service information and the information about the available resource, so that the service processor determines, according to the resource pre-request message, the information about the resource allocated to the $k^{th}$ service type; and receiving, by the resource allocator, a resource pre-request feedback message sent by the service processor, wherein the resource pre-request feedback message carries the information about the resource allocated to the $k^{th}$ service type.

7. The method according to claim 5, wherein the information about the available resource comprises a first quantity of protocol processing modules corresponding to the available resource;

the information about the resource allocated to the $k^{th}$ service type comprises a second quantity of protocol processing modules corresponding to the resource allocated to the $k^{th}$ service type; and the information about the resource that is allocated to each protocol layer in the protocol stack and that is used for processing the to-be-processed service of the $k^{th}$ service type comprises a third quantity of protocol processing modules corresponding to the resource that is allocated to each protocol layer in the protocol stack and that is used for processing the to-be-processed service of the $k^{th}$ service type.

8. The method according to claim 7, wherein the information about the protocol stack comprises a processing capability of a protocol processing module at each protocol layer in the protocol stack; and determining, by the resource allocator, the third quantity according to the information about the protocol stack corresponding to the $k^{th}$ service type and the second quantity comprises:

determining, by the resource allocator, the third quantity according to the second quantity and a processing capability of a protocol processing module at each protocol layer in the protocol stack corresponding to the $k^{th}$ service type, so as to obtain an optimal processing capability of performing protocol processing on the to-be-processed service of the $k^{th}$ service type at all the protocol layers by using the allocated resources.

9. The method according to claim 8, wherein the processing capability of the protocol processing module at each protocol layer in the protocol stack comprises a processing delay of the protocol processing module at each protocol layer in the protocol stack, a transmission delay between protocol processing modules at two adjacent protocol layers, and a quantity of data packets of the to-be-processed service of the $k^{th}$ service type; and the optimal processing capability of performing protocol processing on the to-be-processed service of the $k^{th}$ service type at all the protocol layers by using the allocated resources comprises a minimum sum of delays in protocol processing on the to-be-processed service of the $k^{th}$ service type at all the protocol layers by using the allocated resources, or a maximum data throughput in protocol processing on the to-be-processed service of the $k^{th}$ service type at all the protocol layers by using the allocated resources.

10. The method according to claim 9, wherein the determining, by the resource allocator, the third quantity according to the processing delay, the transmission delay, the quantity of data packets of the to-be-processed service, and the second quantity, so as to obtain the minimum sum of delays in protocol processing on the to-be-processed service of the $k^{th}$ service type at all the protocol layers by using the allocated resources, comprises:

determining, by the resource allocator according to a formula $$\min F(l_1^k, l_2^k, L, l_N^k) = \sum_{i=1}^{N}(T_i + \Delta T_i) + \left(\frac{P^k}{l_{i^*}^k} - 1\right)(T_{i^*} + \Delta T_{i^*}),$$

a third quantity $l_i^k$ of protocol processing modules that are allocated to an $i^{th}$ protocol layer in the protocol stack and that are corresponding to a resource used for processing the to-be-processed service of the $k^{th}$ service type, wherein $$\sum_{i=1}^{N} l_i^k = M_k,$$

$1 \le l_i^k \le M_k - N + 1$, $$i^* = \underset{i \in S}{\operatorname{argmax}} \frac{T_i + \Delta T_i}{l_i^k},$$

$S = \{1, 2, L, N\}$, N is a total quantity of protocol layers in the protocol stack, i is any value ranging from 1 to N, S is a set comprising positive integers 1 to N, $i^*$ is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, $P_k$ is a quantity of data packets of the to-be-processed service of the $k^{th}$ service type, $M_k$ is the second quantity, and min $F(l_1^k, l_2^k, L, l_N^k)$ indicates the minimum sum of delays in protocol processing on the to-be-processed service of the $k^{th}$ service type at all the protocol layers by using the allocated resources.

11. The method according to claim 9, wherein the determining, by the resource allocator, the third quantity according to the processing delay, the transmission delay, the quantity of data packets of the to-be-processed service, and the second quantity, so as to obtain the maximum data throughput in protocol processing on the to-be-processed service of the $k^{th}$ service type at all the protocol layers by using the allocated resources, comprises:

determining, by the resource allocator according to a formula $$\min F(l_1^k, l_2^k, L, l_N^k) = \frac{P_k}{\sum_{i=1}^{N}(T_i + \Delta T_i) + \left(\frac{P_k}{l_{i^*}^k} - 1\right)(T_{i^*} + \Delta T_{i^*})},$$

a third quantity $l_i^k$ of protocol processing modules that are allocated to an $i^{th}$ protocol layer in the protocol stack and that are corresponding to a resource used for processing the to-be-processed service of the $k^{th}$ service type, wherein $$\sum_{i=1}^{N} l_i^k = M_k,$$

$1 \le l_i^k \le M_k - N + 1$, $$i^* = \underset{i \in S}{\arg\max} \frac{T_i + \Delta T_i}{l_i},$$

S={1, 2, L, N}, N is a total quantity of protocol layers in the protocol stack, i is any value ranging from 1 to N S is a set comprising positive integers 1 to N, i* is i in S that maximizes a value of $$\frac{T_i + \Delta T_i}{l_i},$$

$T_i$ is a processing delay of a protocol processing module at the $i^{th}$ protocol layer, $\Delta T_i$ is a transmission delay between the protocol processing module at the $i^{th}$ protocol layer and a protocol processing module at an $(i+1)^{th}$ protocol layer, $\Delta T_N$ is zero, $P_k$ is a quantity of data packets of the to-be-processed service of the $k^{th}$ service type, $M_k$ is the second quantity, and min $F(l_1^k, l_2^k, L, l_N^k)$ indicates the maximum data throughput in protocol processing on the to-be-processed service of the $k^{th}$ service type at all the protocol layers by using the allocated resources.

12. The method according to claim 1, wherein the SDP network further comprises a resource pool, wherein
the determining, by the resource allocator, information about an available resource on the SDP network comprises:
sending, by the resource allocator, an available-resource request message to the resource pool, so that the resource pool determines the information about the available resource on the SDP network, wherein the available resource is used for resource allocation of the protocol stack; and
receiving, by the resource allocator, an available-resource feedback message sent by the resource pool, wherein the available-resource feedback message carries the information about the available resource.

13. The method according to claim 1, wherein when the SDP network is a distributed network, the available resource is a local available resource of the protocol stack deployment node; or when the SDP network is a centralized network, the available resource is a global available resource on the SDP network.

14. A resource allocation system on a Software Defined Protocol (SDP) network, comprising a protocol stack deployment node and a resource allocator, wherein
the resource allocator comprises a first receiver, a first processor, and a first transmitter;
the protocol stack deployment node is configured to send a resource request message to the resource allocator, wherein the resource request message carries information about a protocol stack deployed on the protocol stack deployment node, wherein the information about the protocol stack comprises a processing capability of a protocol processing module at each protocol layer in the protocol stack, wherein the processing capability of the protocol processing module at each protocol layer in the protocol stack comprises a processing delay of the protocol processing module at each protocol layer in the protocol stack, a transmission delay between protocol processing modules at two adjacent protocol layers, and a quantity of data packets of at least one to-be-processed service;
the first receiver is configured to receive the resource request message sent by the protocol stack deployment node;
the first processor is configured to determine information about an available resource on the SDP network, wherein the available resource is used for resource allocation of the protocol stack, wherein the information about the available resource comprises a first quantity of protocol processing modules corresponding to the available resource;
the first processor is further configured to determine, according to the information about the protocol stack and the information about the available resource, information about a resource allocated to each protocol layer in the protocol stack, wherein the information about the resource allocated to each protocol layer in the protocol stack comprises a second quantity of protocol processing modules corresponding to the allocated resource, wherein determining the information about the resource allocated to each protocol layer in the protocol stack further comprises determining, the second quantity according to the processing capability of the protocol processing module at each protocol layer in the protocol stack and the first quantity, so as to obtain an optimal processing capability of performing protocol processing at all the protocol layers by using allocated resources;
the first transmitter is configured to send a resource feedback message to the protocol stack deployment node, wherein the resource feedback message carries the information about the resource allocated to each protocol layer in the protocol stack; and
the protocol stack deployment node is further configured to receive the resource feedback message sent by the resource allocator.

15. The system according to claim 14, wherein the fast processor is configured to determine the second quantity according to the processing delay, the transmission delay, the quantity of data packets of the to-be-processed service, and the first quantity, so as to obtain a minimum sum of delays in protocol processing at all the protocol layers by using the allocated resources, or a maximum data throughput in protocol processing at all the protocol layers by using the allocated resources.

16. A non-transitory computer-readable medium comprising code which, when executed by a processor, causes the processor to perform a method comprising:
receiving, by a resource allocator of a Software Defined Protocol (SDP) network, a resource request message sent by a protocol stack deployment node of the SDP network, wherein the resource request message carries information about a protocol stack deployed on the protocol stack deployment node, wherein the information about the protocol stack comprises a processing capability of a protocol processing module at each protocol layer in the protocol stack, wherein the processing capability of the protocol processing module at each protocol layer in the protocol stack comprises a processing delay of the protocol processing module at each protocol layer in the protocol stack, a transmission delay between protocol processing modules at two adjacent protocol layers, and a quantity of data packets of at least one to-be-processed service;

determining, by the resource allocator, information about an available resource on the SDP network, wherein the available resource is used for resource allocation of the protocol stack, wherein the information about the available resource comprises a first quantity of protocol processing modules corresponding to the available resource;

determining, by the resource allocator according to the information about the protocol stack and the information about the available resource, information about a resource allocated to each protocol layer in the protocol stack, wherein the information about the resource allocated to each protocol layer in the protocol stack comprises a second quantity of protocol processing modules corresponding to the allocated resource, wherein determining the information about the resource allocated to each protocol layer in the protocol stack further comprises determining, by the resource allocator, the second quantity according to the processing capability of the protocol processing module at each protocol layer in the protocol stack and the first quantity, so as to obtain an optimal processing capability of performing protocol processing at all the protocol layers by using allocated resources; and sending, by the resource allocator, a resource feedback message to the protocol stack deployment node, wherein the resource feedback message carries the information about the resource allocated to each protocol layer in the protocol stack.

\* \* \* \* \*

UNITED STATES PATENT AND TRADEMARK OFFICE
CERTIFICATE OF CORRECTION

PATENT NO. : 10,778,606 B2
APPLICATION NO. : 15/942114
DATED : September 15, 2020
INVENTOR(S) : Hong Li et al.

It is certified that error appears in the above-identified patent and that said Letters Patent is hereby corrected as shown below:

In the Specification

In Column 2, Line 65, delete " $\min F(l_1, l_2, L, l_N) = \sum_{i=1}^{N}(T_i + \Delta T_i) + (\frac{P}{l_{i^*}} - 1)(T_{i^*} + \Delta T_{i^*})$ " and insert -- $\min F(l_1, l_2, \cdots, l_N) = \sum_{i=1}^{N}(T_i + \Delta T_i) + (\frac{P}{l_{i^*}} - 1)(T_{i^*} + \Delta T_{i^*})$ --.

In Column 3, Line 15, delete "$S = \{1,2,L,N\}$" and insert --$S = \{1,2, \cdots, N\}$--.

In Column 3, Line 31, delete "min $F(l_1, l_2, L, l_N)$" and insert --min $F(l_1, l_2, \cdots, l_N)$--.

In Column 3, Line 45, delete " $\min F(l_1, l_2, L, l_N) = \frac{P}{\sum_{i=1}^{N}(T_i + \Delta T_i) + (\frac{P}{l_{i^*}} - 1)(T_{i^*} + \Delta T_{i^*})}$ ," and insert -- $\min F(l_1, l_2, \cdots, l_N) = \frac{P}{\sum_{i=1}^{N}(T_i + \Delta T_i) + (\frac{P}{l_{i^*}} - 1)(T_{i^*} + \Delta T_{i^*})}$ --.

In Column 3, Line 66, delete "$S = \{1,2,L,N\}$" and insert --$S = \{1,2, \cdots, N\}$--.

In Column 4, Line 18, delete "min $F(l_1, l_2, L, l_N)$" and insert --min $F(l_1, l_2, \cdots, l_N)$--.

In Column 5, Line 55, delete " $\min F(l_1^k, l_2^k, L, l_N^k) = \sum_{i=1}^{N}(T_i + \Delta T_i) + (\frac{P^k}{l_i^k} - 1)(T_{i^*} + \Delta T_{i^*})$ " and insert -- $\min F(l_1^k, l_2^k, \cdots, l_N^k) = \sum_{i=1}^{N}(T_i + \Delta T_i) + (\frac{P^k}{l_i^k} - 1)(T_{i^*} + \Delta T_{i^*})$ --.

Signed and Sealed this
Sixth Day of April, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)

U.S. Pat. No. 10,778,606 B2

Page 2 of 8

In Column 6, Line 40, delete "$minF(l_1^k, l_2^k, L, l_N^k) = \frac{P^k}{\sum_{i=1}^{N}(T_i + \Delta T_i) + (\frac{P^k}{l_i^k} - 1)(T_{i^*} + \Delta T_{i^*})}$" and insert --$minF(l_1^k, l_2^k, \cdots, l_N^k) = \frac{P^k}{\sum_{i=1}^{N}(T_i + \Delta T_i) + (\frac{P^k}{l_i^k} - 1)(T_{i^*} + \Delta T_{i^*})}$--.

In Column 6, Line 64, delete "$S = \{1,2,L,N\}$" and insert --$S = \{1,2,\cdots,N\}$--.

In Column 7, Line 12, delete "$minF(l_1^k, l_2^k, L, l_N^k)$" and insert --$minF(l_1^k, l_2^k, \cdots, l_N^k)$--.

In Column 8, Line 40, delete "$min F(l_1, l_2, L, l_N) = \sum_{i=1}^{N}(T_i + \Delta T_i) + (\frac{P}{l_{i^*}} - 1)(T_{i^*} + \Delta T_{i^*})$" and insert --$min F(l_1, l_2, \cdots, l_N) = \sum_{i=1}^{N}(T_i + \Delta T_i) + (\frac{P}{l_{i^*}} - 1)(T_{i^*} + \Delta T_{i^*})$--.

In Column 8, Line 58, delete "$S = \{1,2,L,N\}$" and insert --$S = \{1,2,\cdots,N\}$--.

In Column 9, Line 15, delete "$minF(l_1, l_2, L, l_N) = \frac{P}{\sum_{i=1}^{N}(T_i + \Delta T_i) + (\frac{P}{l_{i^*}} - 1)(T_{i^*} + \Delta T_{i^*})}$" and insert --$minF(l_1, l_2, \cdots, l_N) = \frac{P}{\sum_{i=1}^{N}(T_i + \Delta T_i) + (\frac{P}{l_{i^*}} - 1)(T_{i^*} + \Delta T_{i^*})}$--.

In Column 9, Line 36, delete "$S = \{1,2,L,N\}$" and insert --$S = \{1,2,\cdots,N\}$--.

In Column 9, Line 53, delete "$min F(l_1, l_2, L, l_N)$" and insert --$min F(l_1, l_2, \cdots, l_N)$--.

In Column 11, Line 25, delete "$minF(l_1^k, l_2^k, L, l_N^k) = \sum_{i=1}^{N}(T_i + \Delta T_i) + (\frac{P^k}{l_i^k} - 1)(T_{i^*} + \Delta T_{i^*})$" and insert --$minF(l_1^k, l_2^k, \cdots, l_N^k) = \sum_{i=1}^{N}(T_i + \Delta T_i) + (\frac{P^k}{l_i^k} - 1)(T_{i^*} + \Delta T_{i^*})$--.

In Column 11, Line 44, delete "$S = \{1,2,L,N\}$" and insert --$S = \{1,2,\cdots,N\}$--.

In Column 11, Line 60, delete "$minF(l_1^k, l_2^k, L, l_N^k)$" and insert --$minF(l_1^k, l_2^k, \cdots, l_N^k)$--.

In Column 12, Line 5, delete "$minF(l_1^k, l_2^k, L, l_N^k) = \frac{P^k}{\sum_{i=1}^{N}(T_i + \Delta T_i) + (\frac{P^k}{l_i^k} - 1)(T_{i^*} + \Delta T_{i^*})}$" and insert

CERTIFICATE OF CORRECTION (continued)
U.S. Pat. No. 10,778,606 B2

$$\min F(l_1^k, l_2^k, \cdots, l_N^k) = \frac{P^k}{\sum_{i=1}^{N}(T_i + \Delta T_i) + (\frac{P^k}{l_i^k} - 1)(T_{i^*} + \Delta T_{i^*})}$$
--.

In Column 12, Line 23, delete "$S = \{1,2,L,N\}$" and insert --$S = \{1,2, \cdots, N\}$--.

In Column 12, Line 38, delete "$\min F(l_1^k, l_2^k, L, l_N^k)$" and insert --$\min F(l_1^k, l_2^k, \cdots, l_N^k)$--.

In Column 14, Line 25, delete "$\min F (l_1, l_2, L, l_N) = \sum_{i=1}^{N}(T_i + \Delta T_i) + (\frac{P}{l_{i^*}} - 1)(T_{i^*} + \Delta T_{i^*})$" and insert $$\min F (l_1, l_2, \cdots, l_N) = \sum_{i=1}^{N}(T_i + \Delta T_i) + (\frac{P}{l_{i^*}} - 1)(T_{i^*} + \Delta T_{i^*})$$
--.

In Column 14, Line 46, delete "$S = \{1,2,L,N\}$" and insert --$S = \{1,2, \cdots, N\}$--.

In Column 15, Line 1, delete "$\min F(l_1, l_2, L, l_N) = \frac{P}{\sum_{i=1}^{N}(T_i + \Delta T_i) + (\frac{P}{l_{i^*}} - 1)(T_{i^*} + \Delta T_{i^*})}$," and insert $$\min F(l_1, l_2, \cdots, l_N) = \frac{P}{\sum_{i=1}^{N}(T_i + \Delta T_i) + (\frac{P}{l_{i^*}} - 1)(T_{i^*} + \Delta T_{i^*})}$$
--.

In Column 15, Line 21, delete "$S = \{1,2,L,N\}$" and insert --$S = \{1,2, \cdots, N\}$--.

In Column 15, Line 39, delete "$\min F (l_1, l_2, L, l_N)$" and insert --$\min F (l_1, l_2, \cdots, l_N)$--.

In Column 17, Line 5, delete "$\min F(l_1^k, l_2^k, L, l_N^k) = \sum_{i=1}^{N}(T_i + \Delta T_i) + (\frac{P^k}{l_{i^*}^k} - 1)(T_{i^*} + \Delta T_{i^*})$" and insert $$\min F(l_1^k, l_2^k, \cdots, l_N^k) = \sum_{i=1}^{N}(T_i + \Delta T_i) + (\frac{P^k}{l_{i^*}^k} - 1)(T_{i^*} + \Delta T_{i^*})$$
--.

In Column 17, Line 27, delete "$S = \{1,2,L,N\}$" and insert --$S = \{1,2, \cdots, N\}$--.

In Column 17, Line 53, delete "$\min F(l_1^k, l_2^k, L, l_N^k) = \frac{P^k}{\sum_{i=1}^{N}(T_i + \Delta T_i) + (\frac{P^k}{l_{i^*}^k} - 1)(T_{i^*} + \Delta T_{i^*})}$," and insert $$\min F(l_1^k, l_2^k, \cdots, l_N^k) = \frac{P^k}{\sum_{i=1}^{N}(T_i + \Delta T_i) + (\frac{P^k}{l_{i^*}^k} - 1)(T_{i^*} + \Delta T_{i^*})}$$
--.

In Column 18, Line 5, delete "$S = \{1,2,L,N\}$" and insert --$S = \{1,2, \cdots, N\}$--.

CERTIFICATE OF CORRECTION (continued)

U.S. Pat. No. 10,778,606 B2

Page 4 of 8

In Column 18, Line 21, delete "$minF(l_1^k, l_2^k, L, l_N^k)$," and insert --$minF(l_1^k, l_2^k, \cdots, l_N^k)$--.

In Column 24, Line 32, delete "$minF(l_1^k, l_2^k, L, l_N^k) = \sum_{i=1}^{N}(T_i + \Delta T_i) + (\frac{p^k}{l_i^k} - 1)(T_{i^*} + \Delta T_{i^*})$" and insert --$minF(l_1^k, l_2^k, \cdots, l_N^k) = \sum_{i=1}^{N}(T_i + \Delta T_i) + (\frac{p^k}{l_i^k} - 1)(T_{i^*} + \Delta T_{i^*})$--.

In Column 24, Line 49, delete "$S = \{1,2,L,N\}$" and insert --$S = \{1,2,\cdots,N\}$--.

In Column 24, Line 67, delete "min $F(l_1,l_2,L,l_N)$" and insert --min $F(l_1,l_2,\cdots,l_N)$--.

In Column 25, Line 15, delete "$minF(l_1,l_2,L,l_N) = \frac{P}{\sum_{i=1}^{N}(T_i + \Delta T_i) + (\frac{P}{l_i} - 1)(T_{i^*} + \Delta T_{i^*})}$," and insert --$minF(l_1,l_2,\cdots,l_N) = \frac{P}{\sum_{i=1}^{N}(T_i + \Delta T_i) + (\frac{P}{l_i} - 1)(T_{i^*} + \Delta T_{i^*})}$--.

In Column 25, Line 31, delete "$S = \{1,2,L,N\}$" and insert --$S = \{1,2,\cdots,N\}$--.

In Column 25, Line 49, delete "min $F(l_1,l_2,L,l_N)$" and insert --min $F(l_1,l_2,\cdots,l_N)$--.

In Column 30, Line 45, delete "$minF(l_1^k, l_2^k, L, l_N^k) = \sum_{i=1}^{N}(T_i + \Delta T_i) + (\frac{p^k}{l_i^k} - 1)(T_{i^*} + \Delta T_{i^*})$" and insert --$minF(l_1^k, l_2^k, \cdots, l_N^k) = \sum_{i=1}^{N}(T_i + \Delta T_i) + (\frac{p^k}{l_i^k} - 1)(T_{i^*} + \Delta T_{i^*})$--.

In Column 31, Line 1, delete "$S = \{1,2,L,N\}$" and insert --$S = \{1,2,\cdots,N\}$--.

In Column 31, Line 17, delete "$minF(l_1^k, l_2^k, L, l_N^k)$," and insert --$minF(l_1^k, l_2^k, \cdots, l_N^k)$--.

In Column 31, Line 35, delete "$minF(l_1^k, l_2^k, L, l_N^k) = \frac{p^k}{\sum_{i=1}^{N}(T_i + \Delta T_i) + (\frac{p^k}{l_i^k} - 1)(T_{i^*} + \Delta T_{i^*})}$" and insert --$minF(l_1^k, l_2^k, \cdots, l_N^k) = \frac{p^k}{\sum_{i=1}^{N}(T_i + \Delta T_i) + (\frac{p^k}{l_i^k} - 1)(T_{i^*} + \Delta T_{i^*})}$--.

In Column 31, Line 52, delete "$S = \{1,2,L,N\}$" and insert --$S = \{1,2,\cdots,N\}$--.

CERTIFICATE OF CORRECTION (continued)
U.S. Pat. No. 10,778,606 B2

In Column 31, Line 67, delete "$\min F(l_1^k, l_2^k, L, l_N^k)$" and insert --$\min F(l_1^k, l_2^k, \cdots, l_N^k)$--.

In Column 35, Line 30, delete "$\min F(l_1, l_2, L, l_N) = \sum_{i=1}^{N}(T_i + \Delta T_i) + (\frac{P}{l_{i^*}} - 1)(T_{i^*} + \Delta T_{i^*})$" and insert --$\min F(l_1, l_2, \cdots, l_N) = \sum_{i=1}^{N}(T_i + \Delta T_i) + (\frac{P}{l_{i^*}} - 1)(T_{i^*} + \Delta T_{i^*})$--.

In Column 35, Line 47, delete "$S = \{1,2,L,N\}$" and insert --$S = \{1,2, \cdots, N\}$--.

In Column 35, Line 61, delete "min $F(l_1,l_2,L,l_N)$" and insert --min $F(l_1,l_2, \cdots, l_N)$--.

In Column 36, Line 1, delete "$\min F(l_1, l_2, L, l_N) = \frac{P}{\sum_{i=1}^{N}(T_i + \Delta T_i) + (\frac{P}{l_{i^*}} - 1)(T_{i^*} + \Delta T_{i^*})}$" and insert --$\min F(l_1, l_2, \cdots, l_N) = \frac{P}{\sum_{i=1}^{N}(T_i + \Delta T_i) + (\frac{P}{l_{i^*}} - 1)(T_{i^*} + \Delta T_{i^*})}$--.

In Column 36, Line 21, delete "$S = \{1,2,L,N\}$" and insert --$S = \{1,2, \cdots, N\}$--.

In Column 36, Line 39, delete "min $F(l_1,l_2,L,l_N)$" and insert --min $F(l_1,l_2, \cdots, l_N)$--.

In Column 39, Line 54, delete "$\min F(l_1^k, l_2^k, L, l_N^k) = \sum_{i=1}^{N}(T_i + \Delta T_i) + (\frac{P^k}{l_{i^*}^k} - 1)(T_{i^*} + \Delta T_{i^*})$" and insert --$\min F(l_1^k, l_2^k, \cdots, l_N^k) = \sum_{i=1}^{N}(T_i + \Delta T_i) + (\frac{P^k}{l_{i^*}^k} - 1)(T_{i^*} + \Delta T_{i^*})$--.

In Column 40, Line 5, delete "$S = \{1,2,L,N\}$" and insert --$S = \{1,2, \cdots, N\}$--.

In Column 40, Line 30, delete "$\min F(l_1^k, l_2^k, L, l_N^k) = \frac{P^k}{\sum_{i=1}^{N}(T_i + \Delta T_i) + (\frac{P^k}{l_{i^*}^k} - 1)(T_{i^*} + \Delta T_{i^*})}$" and insert --$\min F(l_1^k, l_2^k, \cdots, l_N^k) = \frac{P^k}{\sum_{i=1}^{N}(T_i + \Delta T_i) + (\frac{P^k}{l_{i^*}^k} - 1)(T_{i^*} + \Delta T_{i^*})}$--.

In Column 40, Line 51, delete "$S = \{1,2,L,N\}$" and insert --$S = \{1,2, \cdots, N\}$--.

In Column 40, Line 67, delete "$\min F(l_1^k, l_2^k, L, l_N^k)$" and insert --$\min F(l_1^k, l_2^k, \cdots, l_N^k)$--.

CERTIFICATE OF CORRECTION (continued)
U.S. Pat. No. 10,778,606 B2

Page 6 of 8

In Column 43, Line 20, delete "$\min F(l_1,l_2,L,l_N) = \sum_{i=1}^{N}(T_i + \Delta T_i) + (\frac{P}{l_{i^*}} - 1)(T_{i^*} + \Delta T_{i^*})$" and insert --$\min F(l_1,l_2,\cdots,l_N) = \sum_{i=1}^{N}(T_i + \Delta T_i) + (\frac{P}{l_{i^*}} - 1)(T_{i^*} + \Delta T_{i^*})$--.

In Column 43, Line 40, delete "$S = \{1,2,L,N\}$" and insert --$S = \{1,2,\cdots,N\}$--.

In Column 43, Line 60, delete "$\min F(l_1,l_2,L,l_N) = \frac{P}{\sum_{i=1}^{N}(T_i + \Delta T_i) + (\frac{P}{l_{i^*}} - 1)(T_{i^*} + \Delta T_{i^*})}$" and insert --$\min F(l_1,l_2,\cdots,l_N) = \frac{P}{\sum_{i=1}^{N}(T_i + \Delta T_i) + (\frac{P}{l_{i^*}} - 1)(T_{i^*} + \Delta T_{i^*})}$--.

In Column 44, Line 16, delete "$S = \{1,2,L,N\}$" and insert --$S = \{1,2,\cdots,N\}$--.

In Column 44, Line 33, delete "$\min F(l_1,l_2,L,l_N)$" and insert --$\min F(l_1,l_2,\cdots,l_N)$--.

In Column 47, Line 1, delete "$\min F(l_1^k,l_2^k,L,l_N^k) = \sum_{i=1}^{N}(T_i + \Delta T_i) + (\frac{P^k}{l_i^k} - 1)(T_{i^*} + \Delta T_{i^*})$" and insert --$\min F(l_1^k,l_2^k,\cdots,l_N^k) = \sum_{i=1}^{N}(T_i + \Delta T_i) + (\frac{P^k}{l_i^k} - 1)(T_{i^*} + \Delta T_{i^*})$--.

In Column 47, Line 22, delete "$S = \{1,2,L,N\}$" and insert --$S = \{1,2,\cdots,N\}$--.

In Column 47, Line 47, delete "$\min F(l_1^k,l_2^k,L,l_N^k) = \frac{P^k}{\sum_{i=1}^{N}(T_i + \Delta T_i) + (\frac{P^k}{l_i^k} - 1)(T_{i^*} + \Delta T_{i^*})}$" and insert --$\min F(l_1^k,l_2^k,\cdots,l_N^k) = \frac{P^k}{\sum_{i=1}^{N}(T_i + \Delta T_i) + (\frac{P^k}{l_i^k} - 1)(T_{i^*} + \Delta T_{i^*})}$--.

In Column 48, Line 1, delete "$S = \{1,2,L,N\}$" and insert --$S = \{1,2,\cdots,N\}$--.

In Column 48, Line 17, delete "$\min F(l_1^k,l_2^k,L,l_N^k)$" and insert --$\min F(l_1^k,l_2^k,\cdots,l_N^k)$--.

In Column 51, Line 25, delete "$\min F(l_1^k,l_2^k,L,l_N^k) = \sum_{i=1}^{N}(T_i + \Delta T_i) + (\frac{P^k}{l_i^k} - 1)(T_{i^*} + \Delta T_{i^*})$" and insert

CERTIFICATE OF CORRECTION (continued)
U.S. Pat. No. 10,778,606 B2

$$\min F(l_1^k, l_2^k, \cdots, l_N^k) = \sum_{i=1}^{N}(T_i + \Delta T_i) + (\frac{P^k}{l_i^{k*}} - 1)(T_{i^*} + \Delta T_{i^*})$$

--.

In Column 51, Line 45, delete "$S = \{1,2,L,N\}$" and insert --$S = \{1,2,\cdots,N\}$--.

In Column 51, Line 62, delete "$\min F(l_1^k, l_2^k, L, l_N^k)$" and insert -- $\min F(l_1^k, l_2^k, \cdots, l_N^k)$ --.

In Column 52, Line 1, delete "
$$\min F(l_1^k, l_2^k, L, l_N^k) = \frac{P^k}{\sum_{i=1}^{N}(T_i + \Delta T_i) + (\frac{P^k}{l_i^{k*}} - 1)(T_{i^*} + \Delta T_{i^*})}$$
" and insert
$$\min F(l_1^k, l_2^k, \cdots, l_N^k) = \frac{P^k}{\sum_{i=1}^{N}(T_i + \Delta T_i) + (\frac{P^k}{l_i^{k*}} - 1)(T_{i^*} + \Delta T_{i^*})}$$
--.

In Column 52, Line 23, delete "$S = \{1,2,L,N\}$" and insert --$S = \{1,2,\cdots,N\}$--.

In Column 52, Line 39, delete "$\min F(l_1^k, l_2^k, L, l_N^k)$" and insert -- $\min F(l_1^k, l_2^k, \cdots, l_N^k)$ --.

In the Claims

In Claim 2, Column 54, Line 61, delete "the optimal processing capability" and insert --wherein the optimal processing capability--.

In Claim 3, Column 55, Line 10, delete "
$$\min F(l_1, l_2, L, l_N) = \sum_{i=1}^{N}(T_i + \Delta T_i) + (\frac{P_k}{l_{i^*}} - 1)(T_{i^*} + \Delta T_{i^*})$$
"
and insert --
$$\min F(l_1, l_2, \cdots, l_N) = \sum_{i=1}^{N}(T_i + \Delta T_i) + (\frac{P}{l_{i^*}} - 1)(T_{i^*} + \Delta T_{i^*})$$
--.

In Claim 3, Column 55, Line 30, delete "$S = \{1,2,L,N\}$" and insert --$S = \{1,2,\cdots,N\}$--.

In Claim 3, Column 55, Line 46, delete "$\min F(l_1,l_2,L,l_N)$" and insert --$\min F(l_1, l_2, \cdots, l_N)$--.

In Claim 4, Column 55, Line 60, delete "
$$\min F(l_1, l_2, L, l_N) = \frac{P}{\sum_{i=1}^{N}(T_i + \Delta T_i) + (\frac{P}{l_{i^*}} - 1)(T_{i^*} + \Delta T_{i^*})}$$
" and insert
$$\min F(l_1, l_2, \cdots, l_N) = \frac{P}{\sum_{i=1}^{N}(T_i + \Delta T_i) + (\frac{P}{l_{i^*}} - 1)(T_{i^*} + \Delta T_{i^*})}$$
--.

In Claim 4, Column 56, Line 11, delete "$S = \{1,2,L,N\}$" and insert --$S = \{1,2,\cdots,N\}$--.

CERTIFICATE OF CORRECTION (continued)
U.S. Pat. No. 10,778,606 B2

In Claim 4, Column 56, Line 31, delete "min $F(l_1,l_2,L,l_N)$" and insert --min $F(l_1,l_2,\cdots,l_N)$--.

In Claim 10, Column 58, Line 10, delete "$\min F(l_1^k, l_2^k, L, l_N^k) = \sum_{i=1}^{N}(T_i + \Delta T_i) + (\frac{p^k}{l_i^k} - 1)(T_{i^*} + \Delta T_{i^*})$" and insert --$\min F(l_1^k, l_2^k, \cdots, l_N^k) = \sum_{i=1}^{N}(T_i + \Delta T_i) + (\frac{p^k}{l_i^k} - 1)(T_{i^*} + \Delta T_{i^*})$--.

In Claim 10, Column 58, Line 30, delete "$S = \{1,2,L,N\}$" and insert --$S = \{1,2,\cdots,N\}$--.

In Claim 10, Column 58, Line 47, delete "$\min F(l_1^k, l_2^k, L, l_N^k)$" and insert --$\min F(l_1^k, l_2^k, \cdots, l_N^k)$--.

In Claim 11, Column 58, Line 65, delete "$\min F(l_1^k, l_2^k, L, l_N^k) = \frac{p^k}{\sum_{i=1}^{N}(T_i + \Delta T_i) + (\frac{p^k}{l_i^k} - 1)(T_{i^*} + \Delta T_{i^*})}$" and insert --$\min F(l_1^k, l_2^k, \cdots, l_N^k) = \frac{p^k}{\sum_{i=1}^{N}(T_i + \Delta T_i) + (\frac{p^k}{l_i^k} - 1)(T_{i^*} + \Delta T_{i^*})}$--.

In Claim 11, Column 59, Line 18, delete "$S = \{1,2,L,N\}$" and insert --$S = \{1,2,\cdots,N\}$--.

In Claim 11, Column 59, Line 34-35, delete "$\min F(l_1^k, l_2^k, L, l_N^k)$" and insert --$\min F(l_1^k, l_2^k, \cdots, l_N^k)$--.

In Claim 15, Column 60, Line 48, delete "wherein the fast processor" and insert --wherein the first processor--.